United States Patent
Lu et al.

(10) Patent No.: US 10,820,269 B2
(45) Date of Patent: Oct. 27, 2020

(54) METHOD AND APPARATUS FOR POWER SAVING METHOD ON PDSCH (PHYSICAL DOWNLINK SHARED CHANNEL) RECEPTION IN A WIRELESS COMMUNICATION SYSTEM

(71) Applicant: ASUSTek Computer Inc., Taipei (TW)

(72) Inventors: Chia-Chi Lu, Taipei (TW); Ko-Chiang Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 16/507,502

(22) Filed: Jul. 10, 2019

(65) Prior Publication Data

US 2020/0037245 A1    Jan. 30, 2020

Related U.S. Application Data

(60) Provisional application No. 62/711,281, filed on Jul. 27, 2018.

(51) Int. Cl.
*H04L 25/02* (2006.01)
*H04W 72/04* (2009.01)
*H04W 52/02* (2009.01)
*H04W 72/12* (2009.01)

(52) U.S. Cl.
CPC ... *H04W 52/0216* (2013.01); *H04W 72/1273* (2013.01); *H04W 72/1289* (2013.01)

(58) Field of Classification Search
CPC ......... H04W 52/0216; H04W 72/1273; H04W 72/1289; H04L 5/0044; H04L 5/0078; H04L 5/0094; H04L 5/0096; H04L 5/0007; H04L 25/0226

USPC ......................................................... 370/311
See application file for complete search history.

(56) References Cited

U.S. PATENT DOCUMENTS

| | | | |
|---|---|---|---|
| 9,456,393 B2* | 9/2016 | Xu | H04W 48/20 |
| 2017/0079022 A1* | 3/2017 | Kim | H04L 5/0037 |
| 2017/0127414 A1* | 5/2017 | Yi | H04L 27/2611 |
| 2017/0289966 A1* | 10/2017 | Islam | H04L 5/0048 |
| 2018/0343653 A1* | 11/2018 | Guo | H04W 72/046 |
| 2019/0141733 A1* | 5/2019 | Kim | H04W 72/1289 |

(Continued)

OTHER PUBLICATIONS

Samsung: "Discussion on beam indication for PDSCH", 3GPP Draft; R1-1717612, 3rd Generation Partnership Project (3GPP), Mobile Competence Centre ; 650, Route Des Lucioles ; F-06921 Sophia-Antipolis Cedex ; France; vol. RAN WG1, no. Prague, Czech; Oct. 9, 2017-Oct. 13, 2017, Oct. 8, 2017 (Oct. 8, 2017), XP051340798.

(Continued)

*Primary Examiner* — Edan Orgad
*Assistant Examiner* — Vanneilian Lalchinthang
(74) *Attorney, Agent, or Firm* — Skaar Ulbrich Macari, P.A.

(57) ABSTRACT

A method and apparatus are disclosed from the perspective of a User Equipment (UE). In one embodiment, the method includes the UE receiving a configuration of a time domain resource allocation table for PDSCH (Physical Downlink Shared Channel). The method also includes the UE receiving an indication of a first time duration for the bandwidth part, wherein at least one entry in the time domain resource allocation table is associated with a second time duration, and wherein the first time duration restricts time domain allocation of PDSCH.

25 Claims, 17 Drawing Sheets

(56) References Cited

U.S. PATENT DOCUMENTS

2019/0149365 A1* 5/2019 Chatterjee .......... H04L 25/0226
370/329
2019/0159213 A1* 5/2019 Baldemair ............ H04W 76/11

OTHER PUBLICATIONS

Mediatek Inc: "Cross-Slot Scheduling for UE Power Saving", 3GPP Draft; R1-1710838_CROSS_SLOT_SCHEDULING, 3rd Generation Partnership Project (3GPP), Mobile Competence Centre ; 650, Route Des Lucioles ; F-06921 Sophia-Anti Polis Cedex ; France ; vol. RAN WG1, no. Qingdao, P.R. China; Jun. 27, 2017-Jun. 30, 2017 Jun. 26, 2017 (Jun. 26, 2017), XP051300042.
Ericsson: "On the Content of UE Group-Common PDCCH",3GPP Draft; R1-1711484, 3rd Generation Partnership Project (3GPP), Mobile Competence Centre ; 650, Route Des Lucioles ; F-06921 Sophia-Antipolis Cedex ; France vol. RAN WG1, no. Qingdao, P.R. China; Jun. 27, 2017-Jun. 30, 2017, Jun. 17, 2017 (Jun. 17, 2017), XP051305612.
Mediatek Inc: "Discussion on timing relationship for (E)PDCCH and PDSCH", 3GPP Draft; R1-135427 Discussion on Timing Relationship for (E)PDCCH and PDSCH_F, 3rd Generation Partnership Project (3GPP), Mobile Competence Centre ; 650, Route Des Lucioles ; F-06921 Sophia-Anti Pol j vol. RAN WG1, no. San Francisco, USA; Nov. 11, 2013-Nov. 15, 2013, Nov. 13, 2013 (Nov. 13, 2013), XP050735103.
Nokia Networks: "Timing Relationship for MTC", 3GPP Draft; R1-152539, 3rd Generation Partnership Project (3GPP), Mobile Competence Centre ; 650, Route Des Lucioles ; F-06921 Sophia-Anti Polis Cedex ; France j vol. RAN WG1, no. Fukuoka, Japan; May 25, 2015-May 29, 2015, May 15, 2015 (May 15, 2015), XP050970359.
"3rd Generation Partnership Project; Technical Specification Group Radio Access Network; NR; Physical layer procedures for data (Release 15)", 3GPP Standard; Technical Specification; 3GPP TS 38.214, 3rd Generation Partnership Project (3GPP), Mobile Competence Centre ; 650, Route Des Lucioles ; F-06921 Sophia-Anti Polis Cedex ; France, vol. RAN WG1, no. V15.2.0, Jun. 29, 2018 (Jun. 29, 2018), pp. 1-95, XP051474491.
"3rd Generation Partnership Project; Technical Specification Group Radio Access Network; 5GS; User Equipment (UE) conformance specification; Part 3: Protocol Test Suites (Release 15)",3GPP Standard; Technical Specification; 3GPP TS 38.523-3, 3rd Generation Partnership Project (3GPP), Mobile Competence Centre ; 650, Route Des Lucioles ; F-06921 Sophia-Anti Polis Cedex ; France, vol. RAN WG5, no. V15.0.0, Jun. 22, 2018 (Jun. 22, 2018), pp. 1-158, XP051473995.
European Search Report in corresponding EP Application No. 19185403.3, dated Nov. 4, 2019.
ETSI TS 138 214 V15.2.0, "3GPP TS 38.214 version 15.2.0 Release 15" , Jul. 16, 2018. (url: https://www.etsi.org/deliver/etsi_ts/138200_138229/138214/15.02.00_60/).
Samsung, "Discussion on beam indication for PDSCH", 3GPP TSG RAN WG1 Meeting #90bis; R1-1717612, Prague, Czech, Oct. 9-13, 2017. ( url : https://www.3gpp.org/DynaReport/TDocExMtg--R1-90b--17081.htm).
Office Action from TIPO in corresponding TW Application No. 108124355, dated Apr. 30, 2020.

* cited by examiner

| PDSCH mapping type | Normal cyclic prefix ||| Extended cyclic prefix |||
|---|---|---|---|---|---|---|
| | S | L | S+L | S | L | S+L |
| Type A | {0,1,2,3} (Note 1) | {3,...,14} | {3,...,14} | {0,1,2,3} (Note 1) | {3,...,12} | {3,...,12} |
| Type B | {0,...,12} | {2,4,7} | {2,...,14} | {0,...,10} | {2,4,6} | {2,...,12} |
| Note 1: S = 3 is applicable only if dmrs-TypeA-Position = 3 |||||||

FIG. 5 (PRIOR ART)

| $rv_{id}$ indicated by the DCI scheduling the PDSCH | $rv_{id}$ to be applied to $n^{th}$ transmission occasion ||||
|---|---|---|---|---|
| | $n$ mod 4 = 0 | $n$ mod 4 = 1 | $n$ mod 4 = 2 | $n$ mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

FIG. 6 (PRIOR ART)

| RNTI | PDCCH search space | SS/PBCH block and CORESET multiplexing pattern | pdsch-ConfigCommon includes pdsch-AllocationList | pdsch-Config includes pdsch-AllocationList | PDSCH time domain resource allocation to apply |
|---|---|---|---|---|---|
| SI-RNTI | Type0 common | 1 | - | - | Default A for normal CP |
| | | 2 | - | - | Default B |
| | | 3 | - | - | Default C |
| | Type0A common | | | | |
| | | | | | |
| RA-RNTI, TC-RNTI, | Type1 common | 1, 2, 3 | No | - | Default A |
| | | 1, 2, 3 | Yes | - | pdsch-AllocationList provided in pdschConfigCommon |
| P-RNTI | Type2 common | | | | |
| | | | | | |
| C-RNTI, CS-RNTI | Any common search space associated with CORESET#0 | 1, 2, 3 | No | - | Default A |
| | | 1, 2, 3 | Yes | - | pdsch-AllocationList provided in pdschConfigCommon |
| | | | | | |
| C-RNTI, CS-RNTI | Any common search space not associated with CORESET#0 | 1,2,3 | No | No | Default A |
| | | 1,2,3 | Yes | No | pdsch-AllocationList provided in pdsch-ConfigCommon |
| | UE specific search space | 1,2,3 | No/Yes | Yes | pdsch-AllocationList provided in pdsch-Config |

FIG. 7 (PRIOR ART)

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 8 (PRIOR ART)

| Row index | dmrs-TypeA-Position | PDSCH mapping type | $K_0$ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2,3 | Type B | 0 | 5 | 6 |
| 9 | 2,3 | Type B | 0 | 5 | 2 |
| 10 | 2,3 | Type B | 0 | 9 | 2 |
| 11 | 2,3 | Type B | 0 | 10 | 2 |
| 12 | 2,3 | Type A | 0 | 1 | 11 |
| 13 | 2,3 | Type A | 0 | 1 | 6 |
| 14 | 2,3 | Type A | 0 | 2 | 4 |
| 15 | 2,3 | Type B | 0 | 4 | 6 |
| 16 | 2,3 | Type B | 0 | 8 | 4 |

FIG. 9 (PRIOR ART)

| Row index | dmrs-TypeA-Position | PDSCH mapping type | $K_0$ | S | L |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 1 | 2 | 2 |
| 7 | 2,3 | Type B | 1 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 (Note 1) | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
|  | 3 | Type A | 0 | 3 | 11 |
| 15 | 2,3 | Type B | 1 | 2 | 4 |
| 16 | Reserved | | | | |
| Note 1: If the PDSCH was scheduled with SI-RNTI in PDCCH Type0 common search space, the UE may assume that this PDSCH resource allocation is not applied | | | | | |

FIG. 10 (PRIOR ART)

| Row index | dmrs-TypeA-Position | PDSCH mapping type | $K_0$ | S | L |
|---|---|---|---|---|---|
| 1 (Note 1) | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | Reserved | | | | |
| 7 | Reserved | | | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
|  | 3 | Type A | 0 | 3 | 11 |
| 15 (Note 1) | 2,3 | Type A | 0 | 0 | 6 |
| 16 (Note 1) | 2,3 | Type A | 0 | 2 | 6 |
| Note 1: The UE may assume that this PDSCH resource allocation is not used, if the PDSCH was scheduled with SI-RNTI in PDCCH Type0 common search space | | | | | |

FIG. 11 (PRIOR ART)

| Bandwidth Part Size | Configuration 1 | Configuration 2 |
|---|---|---|
| 1 – 36 | 2 | 4 |
| 37 – 72 | 4 | 8 |
| 73 – 144 | 8 | 16 |
| 145 – 275 | 16 | 16 |

FIG. 12 (PRIOR ART)

| $\mu$ | PDSCH decoding time $N_1$ [symbols] | |
|---|---|---|
| | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
| 0 | 8 | 13 |
| 1 | 10 | 13 |
| 2 | 17 | 20 |
| 3 | 20 | 24 |

FIG. 13 (PRIOR ART)

| $\mu$ | PDSCH decoding time $N_1$ [symbols] | |
|---|---|---|
| | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
| 0 | 3 | [13] |
| 1 | 4.5 | [13] |
| 2 | 9 for frequency range 1 | [20] |

FIG. 14 (PRIOR ART)

METHOD AND APPARATUS FOR POWER SAVING METHOD ON PDSCH (PHYSICAL DOWNLINK SHARED CHANNEL) RECEPTION IN A WIRELESS COMMUNICATION SYSTEM

CROSS-REFERENCE TO RELATED APPLICATIONS

The present Application claims the benefit of U.S. Provisional Patent Application Ser. No. 62/711,281 filed on Jul. 27, 2018, the entire disclosure of which is incorporated herein in its entirety by reference.

FIELD

This disclosure generally relates to wireless communication networks, and more particularly, to a method and apparatus for power saving method on PDSH reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE receiving a configuration of a time domain resource allocation table for PDSCH (Physical Downlink Shared Channel). The method also includes the UE receiving an indication of a first time duration for the bandwidth part, wherein at least one entry in the time domain resource allocation table is associated with a second time duration, and wherein the first time duration restricts time domain allocation of PDSCH.

BRIEF DESCRIPTION OF THE DRAWINGS

FIG. 5 is a reproduction of Table 5.1.2.1-1 of 3GPP TS 38.214 V15.2.0.

FIG. 6 is a reproduction of Table 5.1.2.1-2 of TS 38.214 V15.2.0.

FIG. 7 is a reproduction of Table 5.1.2.1.1-1 of 3GPP TS 38.214 V15.2.0.

FIG. 8 is a reproduction of Table 5.1.2.1.1-2 of 3GPP TS 38.214 V15.2.0.

FIG. 9 is a reproduction of Table 5.1.2.1.1-3 of 3GPP TS 38.214 V15.2.0.

FIG. 10 is a reproduction of Table 5.1.2.1.1-4 of 3GPP TS 38.214 V15.2.0.

FIG. 11 is a reproduction of Table 5.1.2.1.1-5 of 3GPP TS 38.214 V15.2.0.

FIG. 12 is a reproduction of Table 5.1.2.2.1-1 of 3GPP TS 38.214 V15.2.0.

FIG. 13 is a reproduction of Table 5.3-1 of 3GPP TS 38.214 V15.2.0.

FIG. 14 is a reproduction of Table 5.3-2 of 3GPP TS 38.214 V15.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.214 V15.2.0, "Physical layer procedures for data"; TS 38.212 V15.2.0 (2018-6), "Multiplexing and channel coding"; TS 38.211 V15.2.0, "Physical channels and modulation"; TS 38.321 V15.2.0, "Medium Access Control (MAC) protocol specification"; TS 38.213 V15.2.0, "Physical layer procedures for control"; and R1-1710838, "Cross-Slot Scheduling for UE Power Saving", MediaTek Inc. The standards and documents listed above are hereby expressly incorporated by reference in their entirety.

Figure 1:
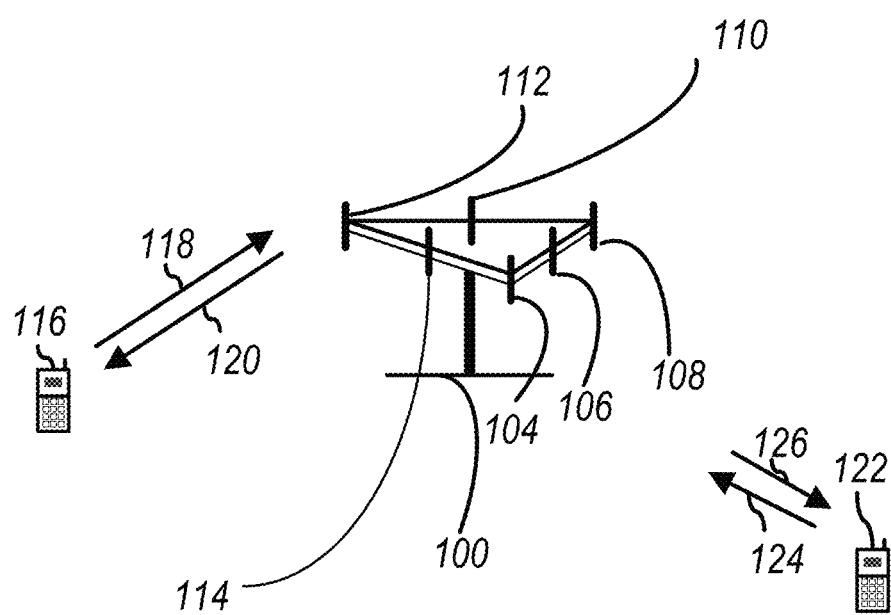
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
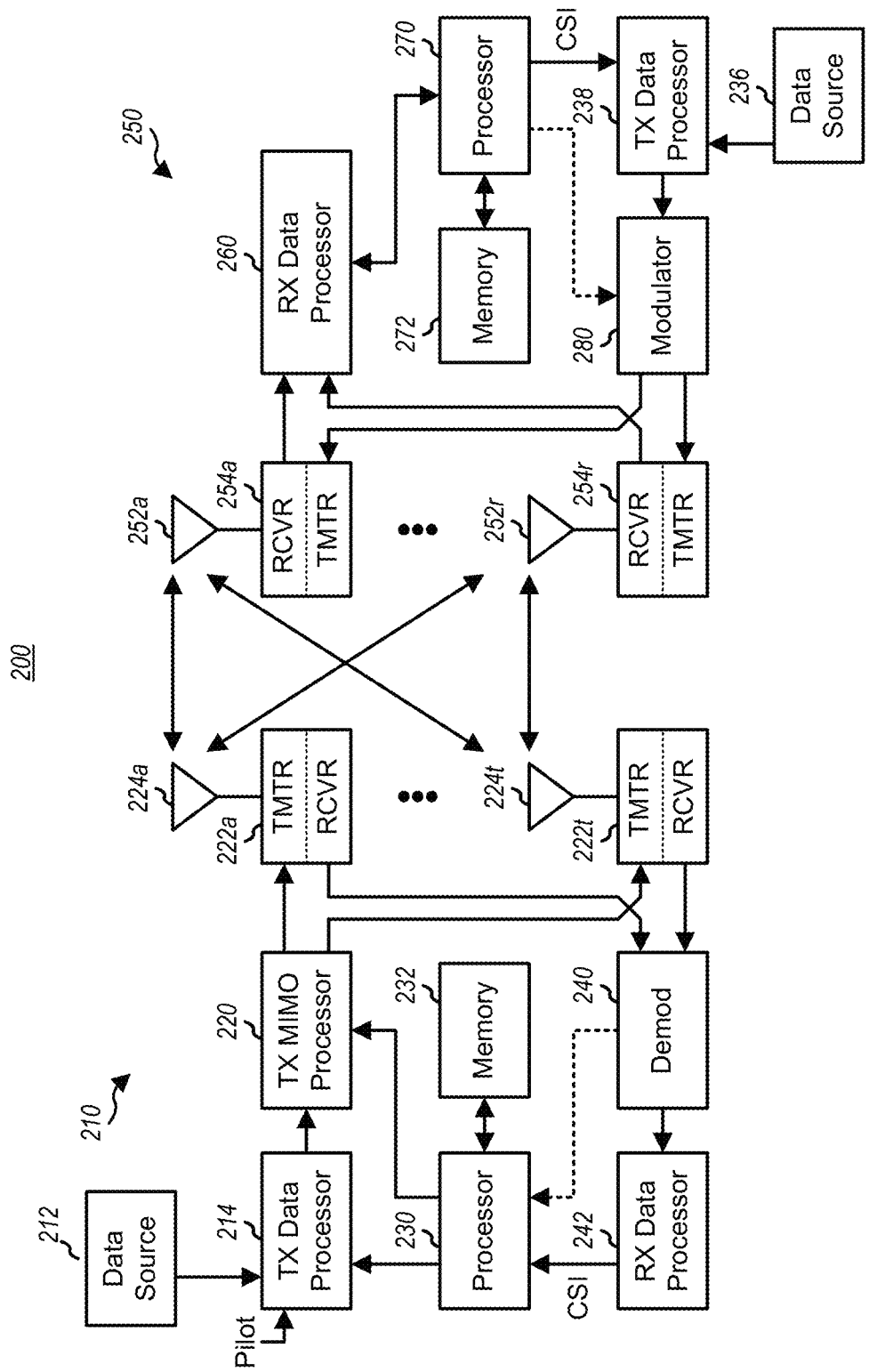
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
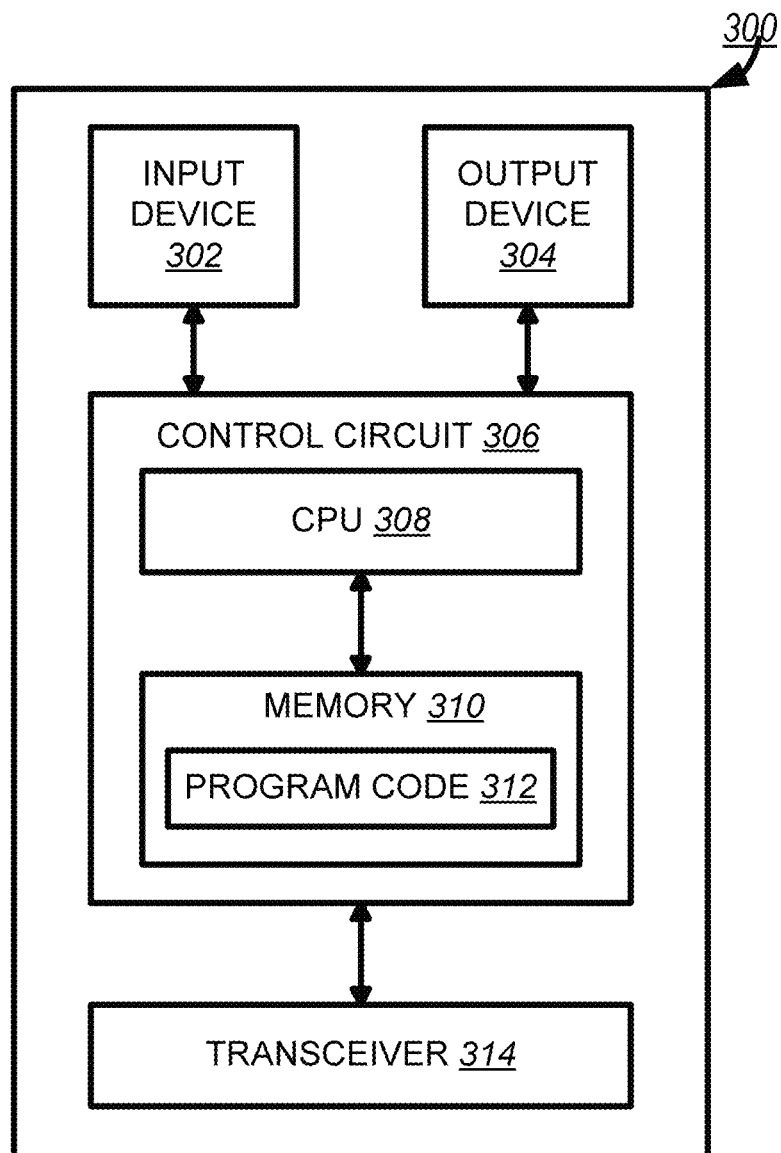
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
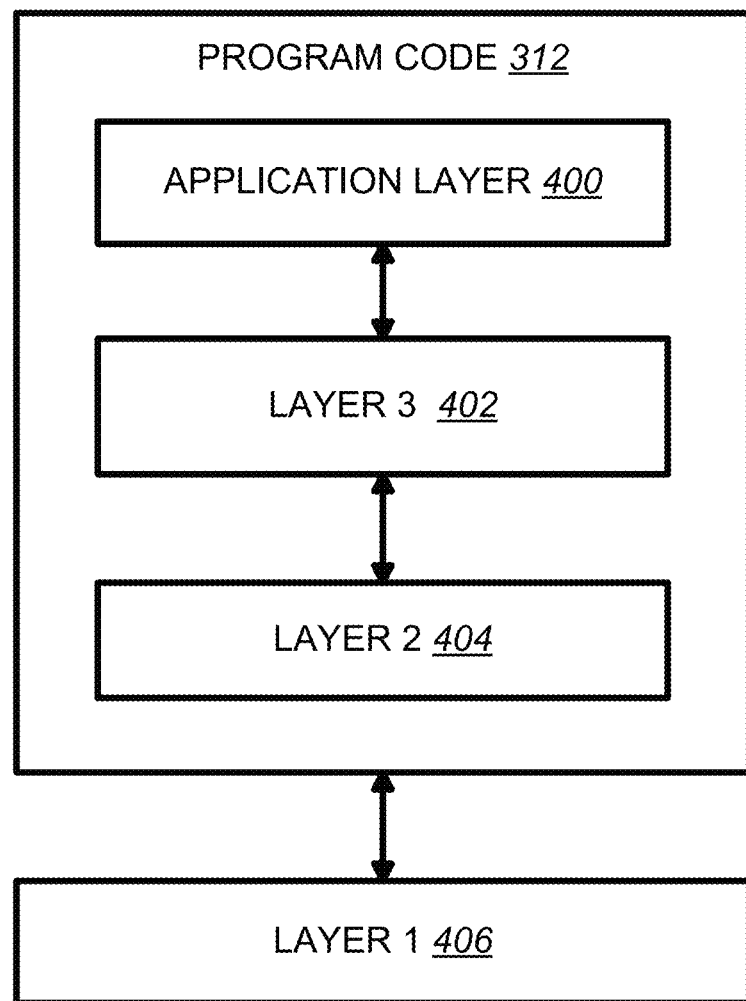
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.214 provides some descriptions related to PDSCH as follows:

5 Physical Downlink Shared Channel Related Procedures
5.1 UE Procedure for Receiving the Physical Downlink Shared Channel For downlink, a maximum of 16 HARQ processes per cell is supported by the UE. The number of processes the UE may assume will at most be used for the downlink is configured to the UE for each cell separately by higher layer parameter nrofHARQ-processesForPDSCH, and when no configuration is provided the UE may assume a default number of 8 processes.

A UE shall upon detection of a PDCCH with a configured DCI format 1_0 or 1_1 decode the corresponding PDSCHs as indicated by that DCI. The UE is not expected to receive another PDSCH for a given HARQ process until after the end of the expected transmission of HARQ-ACK for that HARQ process, where the timing is given by Subclause 9.2.3 of [6]. The UE is not expected to receive a PDSCH in slot i, with the corresponding HARQ-ACK assigned to be transmitted in slot j, and another PDSCH in slot after slot i with its corresponding HARQ-ACK assigned to be transmitted in a slot before slot j. For any two HARQ process IDs in a given cell, if the UE is scheduled to start receiving a PDSCH in symbol j by a PDCCH starting in symbol i, the UE is not expected to be scheduled to receive a PDSCH starting earlier than symbol j with a PDCCH starting later than symbol i.

[ . . . ]

If the UE is not configured for PUSCH/PUCCH transmission for at least one serving cell configured with slot formats comprised of DL and UL symbols, and if the UE is not capable of simultaneous reception and transmission on serving cell $c_1$ and serving cell $c_2$, the UE is not expected to receive PDSCH on serving cell $c_1$ if the PDSCH overlaps in time with SRS transmission (including any interruption due to uplink or downlink RF retuning time [10]) on serving cell $c_2$ not configured for PUSCH/PUCCH transmission.

The UE is not expected to decode a PDSCH scheduled in the primary cell with C-RNTI and another PDSCH scheduled in the primary cell with CS-RNTI if the PDSCHs partially or fully overlap in time.

The UE is not expected to decode a PDSCH scheduled with C-RNTI or CS-RNTI if another PDSCH in the same cell scheduled with RA-RNTI partially or fully overlap in time.

The UE in RRC Idle mode shall be able to decode two PDSCHs each scheduled with SI-RNTI, P-RNTI, RA-RNTI or TC-RNTI, with the two PDSCHs partially or fully overlapping in time in non-overlapping PRBs.

On a frequency range 1 cell, the UE shall be able to decode a PDSCH scheduled with C-RNTI or CS-RNTI and, during a process of P-RNTI triggered SI acquisition, another PDSCH scheduled with SI-RNTI that partially or fully overlap in time in non-overlapping PRBs.

On a frequency range 2 cell, the UE is not expected to decode a PDSCH scheduled with C-RNTI or CS-RNTI if in the same cell, during a process of P-RNTI triggered SI acquisition, another PDSCH scheduled with SI-RNTI partially or fully overlap in time in non-overlapping PRBs.

The UE is expected to decode a PDSCH scheduled with C-RNTI or CS-RNTI during a process of autonomous SI acquisition.

If the UE is configured by higher layers to decode a PDCCH with its CRC scrambled by a CS-RNTI, the UE shall receive PDSCH transmissions without corresponding PDCCH transmissions using the higher-layer-provided PDSCH configuration for those PDSCHs.

[ . . . ]

5.1.2 Resource Allocation
5.1.2.1 Resource Allocation in Time Domain

When the UE is scheduled to receive PDSCH by a DCI, the Time domain resource assignment field value m of the DCI provides a row index m+1 to an allocation table. The determination of the used resource allocation table is defined in sub-clause 5.1.2.1.1. The indexed row defines the slot offset $K_0$, the start and length indicator SLIV, or directly the start symbol S and the allocation length L, and the PDSCH mapping type to be assumed in the PDSCH reception.

Given the parameter values of the indexed row:
The slot allocated for the PDSCH is $$\left\lfloor n \cdot \frac{2^{\mu_{PDSCH}}}{2^{\mu_{PDCCH}}} \right\rfloor + K_0,$$

where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively, and The starting symbol S relative to the start of the slot, and the number of consecutive symbols L counting from the symbol S allocated for the PDSCH are determined from the start and length indicator SLIV:

if $(L-1) \leq 7$ then

SLIV=14·(L−1)+S else

SLIV=14·(14−L+1)+(14−1−S)

where 0<L≤14−S, and
The PDSCH mapping type is set to Type A or Type B as defined in sub-clause 7.4.1.1.2 of [4, TS 38.211].

The UE shall consider the S and L combinations defined in table 5.1.2.1-1 as valid PDSCH allocations:
[Table 5.1.2.1-1 of 3GPP TS 38.214 V15.2.0, Entitled "Valid S and L Combinations, is Reproduced as FIG. 5]

When the UE is configured with aggregationFactorDL>1, the same symbol allocation is applied across the aggregationFactorDL consecutive slots. The UE may expect that the TB is repeated within each symbol allocation among each of the aggregationFactorDL consecutive slots and the PDSCH is limited to a single transmission layer. The redundancy version to be applied on the $n^{th}$ transmission occasion of the TB is determined according to table 5.1.2.1-2.
[Table 5.1.2.1-2 of TS 38.214 V15.2.0, Entitled "Applied Redundancy Version when aggregationFactorDL>1", is Reproduced as FIG. 6]

If the UE procedure for determining slot configuration as defined in Subclause 11.1 of [6, TS 38.213] determines symbol of a slot allocated for PDSCH as uplink symbols, the transmission on that slot is omitted for multi-slot PDSCH transmission.

The UE is not expected to receive a PDSCH with mapping type A in a slot, if the PDCCH scheduling the PDSCH was received in the same slot and was not contained within the first three symbols of the slot.

The UE is not expected to receive a PDSCH with mapping type B in a slot, if the first symbol of the PDCCH scheduling the PDSCH was received in a later symbol than the first symbol indicated in the PDSCH time domain resource allocation.

5.1.2.1.1 Determination of the Resource Allocation Table to be Used for PDSCH

Table 5.1.2.1.1-1 defines which PDSCH time domain resource allocation configuration to apply. Either a default PDSCH time domain allocation A, B or C according to tables 5.1.2.1.1-2, 5.1.2.1.1-3, 5.1.2.1.1.-4 and 5.1.2.1.1-5 is applied, or the higher layer configured pdsch-AllocationList in either pdsch-ConfigCommon or pdsch-Config is applied.

[Table 5.1.2.1.1-1 of 3GPP TS 38.214 V15.2.0, Entitled "Applicable PDSCH Time Domain Resource Allocation", is Reproduced as FIG. 7]

[Table 5.1.2.1.1-2 of 3GPP TS 38.214 V15.2.0, Entitled "Default PDSCH Time Domain Resource Allocation A for Normal CP", is Reproduced as FIG. 8]

[Table 5.1.2.1.1-3 of 3GPP TS 38.214 V15.2.0, Entitled "Default PDSCH Time Domain Resource Allocation A for Extended CP", is Reproduced as FIG. 9]

[Table 5.1.2.1.1-4 of 3GPP TS 38.214 V15.2.0, Entitled "Default PDSCH Time Domain Resource Allocation B", is Reproduced as FIG. 10]

[Table 5.1.2.1.1-5 of 3GPP TS 38.214 V15.2.0, Entitled "Default PDSCH Time Domain Resource Allocation C", is Reproduced as FIG. 11]

5.1.2.2 Resource Allocation in Frequency Domain

Two downlink resource allocation schemes, type 0 and type 1, are supported. The UE shall assume that when the scheduling grant is received with DCI format 1_0, then downlink resource allocation type 1 is used.

If the scheduling DCI is configured to indicate the downlink resource allocation type as part of the Frequency domain resource assignment field by setting a higher layer parameter resourceAllocation in pdsch-Config to 'dynamicswitch', the UE shall use downlink resource allocation type 0 or type 1 as defined by this DCI field. Otherwise the UE shall use the downlink frequency resource allocation type as defined by the higher layer parameter resourceAllocation.

For a PDSCH scheduled with a DCI format 1_0 in any type of PDCCH common search space, regardless of which bandwidth part is the active bandwidth part, RB numbering starts from the lowest RB of the CORESET in which the DCI was received.

For a PDSCH scheduled otherwise, if a bandwidth part indicator field is not configured in the scheduling DCI, the RB indexing for downlink type 0 and type 1 resource allocation is determined within the UE's active bandwidth part. If a bandwidth part indicator field is configured in the scheduling DCI, the RB indexing for downlink type 0 and type 1 resource allocation is determined within the UE's bandwidth part indicated by bandwidth part indicator field value in the DCI. The UE shall upon detection of PDCCH intended for the UE determine first the downlink carrier bandwidth part and then the resource allocation within the bandwidth part.

5.1.2.2.1 Downlink Resource Allocation Type 0

In downlink resource allocation of type 0, the resource block assignment information includes a bitmap indicating the Resource Block Groups (RBGs) that are allocated to the scheduled UE where a RBG is a set of consecutive virtual resource blocks defined by higher layer parameter rbg-Size configured by PDSCH-Config and the size of the carrier bandwidth part as defined in Table 5.1.2.2.1-1.

[Table 5.1.2.2.1-1 of 3GPP TS 38.214 V15.2.0, Entitled "Nominal RBG Size P", is Reproduced as FIG. 12]

The total number of RBGs ($N_{RBG}$) for a downlink bandwidth part i of size $N_{BWP,i}^{size}$ PRBs is given by $N_{RBG}=\lceil (N_{BWP,i}^{size}+(N_{BWP,i}^{start} \bmod P))/P \rceil$, where the size of the first RBG is $RBG_0^{size}=P-N_{BWP,i}^{start} \bmod P$, the size of last RBG is $RBG_{last}^{size}=(N_{BWP,i}^{start}+N_{BWP,i}^{size}) \bmod P$ if $(N_{BWP,i}^{start}+N_{BWP,i}^{size}) \bmod P > 0$ and P otherwise, the size of all other RBGs is P.

The bitmap is of size $N_{RBG}$ bits with one bitmap bit per RBG such that each RBG is addressable. The RBGs shall be indexed in the order of increasing frequency and starting at the lowest frequency of the carrier bandwidth part. The order of RBG bitmap is such that RBG 0 to RBG $N_{RBG}-1$ are mapped from MSB to LSB. The RBG is allocated to the UE if the corresponding bit value in the bitmap is 1, the RBG is not allocated to the UE otherwise.

5.1.2.2.2 Downlink Resource Allocation Type 1

In downlink resource allocation of type 1, the resource block assignment information indicates to a scheduled UE a set of contiguously allocated non-interleaved or interleaved virtual resource blocks within the active bandwidth part of size $N_{BWP}^{size}$ PRBs except for the case when DCI format 1_0 is decoded in any common search space in CORESET 0 in which case the initial bandwidth part of size $N_{BWP,0}^{size}$ shall be used.

A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by if $(L_{RBs}-1) \leq \lfloor N_{BWP}^{size}/2 \rfloor$ then $RIV = N_{BWP}^{size}(L_{RBs}-1)+RB_{start}$ else $RIV = N_{BWP}^{size}(N_{BWP}^{size}-L_{RBs}+1)+(N_{BWP}^{size}-1-RB_{start})$ where $L_{RBs} \geq 1$ and shall not exceed $N_{BWP}^{size}-RB_{start}$.

When the DCI size for DCI format 1_0 in USS is derived from the initial BWP with size $N_{BWP}^{initial}$ but applied to another active BWP with size of $N_{BWP}^{active}$, a downlink type 1 resource block assignment field consists of a resource indication value (RIV) corresponding to a starting resource block $RB_{start}=0, K, 2 \cdot K, \ldots, (N_{BWP}^{initial}-1) \cdot K$ and a length in terms of virtually contiguously allocated resource blocks $L_{RBs}=K, 2 \cdot K, \ldots, N_{BWP}^{initial} \cdot K$.

The resource indication value is defined by:

if $(L'_{RBs}-1) \leq \lfloor N_{BWP}^{initial}/2 \rfloor$ then $RIV = N_{BWP}^{initial}(L'_{RBs}-1)+RB'_{start}$ else $RIV = N_{BWP}^{initial}(N_{BWP}^{initial}-L'_{RBs}+1)+(N_{BWP}^{initial}-1-RB'_{start})$ where $L'_{RBs}=L_{RBs}/K$, $RB'_{start}=RB_{start}/K$ and where $L'_{RBs}$ shall not exceed $N_{BWP}^{initial}-RB'_{start}$.

If $N_{BWP}^{active} < N_{BWP}^{initial}$, K is the maximum value from set $\{1, 2, 4, 8\}$ which satisfies $K \leq \lfloor N_{BWP}^{active}/N_{BWP}^{initial} \rfloor$; otherwise K=1.

[ . . . ]
5.3 UE PDSCH Processing Procedure Time

If the first uplink symbol of the physical channel which carries the HARQ-ACK information, as defined by the assigned HARQ-ACK timing $K_1$ and the PUSCH or PUCCH resource to be used and including the effect of the timing advance, starts no earlier than at symbol $L_1$ then the UE shall provide a valid HARQ-ACK message, where $L_1$ is defined as the next uplink symbol with its CP starting after $T_{proc,1}=((N_1+d_{1,1}+d_{1,2})(2048+144)\cdot\kappa 2^{-\mu})\cdot T_c$ after the end of the last symbol of the PDSCH carrying the TB being acknowledged.

$N_1$ is based on $\mu$ of table 5.3-1 and table 5.3-2 for UE processing capability 1 and 2 respectively, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in subclause 4.41 of [4, TS 38.211].

If HARQ-ACK is transmitted on PUCCH, then $d_{1,1}=0$.
If HARQ-ACK is transmitted on PUSCH, then $d_{1,1}=1$.
If the UE is configured with multiple active component carriers, the first uplink symbol which carries the HARQ-ACK information further includes the effect of timing difference between the component carriers as given in [11, TS 38.133].

If the PDSCH is mapping type A as given in subclause 7.4.1.1 of [4, TS 38.211], and the last symbol of PDSCH is on the i-th symbol of the slot where i<7, then $d_{1,2}=7-i$, For UE processing capability 1: If the PDSCH is mapping type B as given in subclause 7.4.1.1 of [4, TS 38.211], and
  if the number of PDSCH symbols allocated is 4, then $d_{1,2}=3$
  if the number of PDSCH symbols allocated is 2, then $d_{1,2}=3+d$, where d is the number of overlapping symbols of the scheduling PDCCH and the scheduled PDSCH.

For UE processing capability 2: If the PDSCH is mapping type B as given in subclause 7.4.1.1 of [4, TS 38.211], if the number of PDSCH symbols allocated is 2 or 4, then $d_{1,2}$ is the number of overlapping symbols of the scheduling PDCCH and the scheduled PDSCH.

For UE processing capability 2 with scheduling limitation when $\mu=1$, if the scheduled RB allocation exceeds 136 RBs, the UE defaults to capability 1 processing time.

Otherwise the UE may not provide a valid HARQ-ACK corresponding to the scheduled PDSCH. The value of $T_{proc,1}$ is used both in the case of normal and extended cyclic prefix.
[Table 5.3-1 of 3GPP TS 38.214 V15.2.0, Entitled "PDSCH Processing Time for PDSCH Processing Capability 1", is Reproduced as FIG. 13]
[Table 5.3-2 of 3GPP TS 38.214 V15.2.0, Entitled "PDSCH Processing Time for PDSCH Processing Capability 2", is Reproduced as FIG. 14]

3GPP TS 38.212 provides some descriptions related to PDSCH as follows:
7.3.1.2 DCI Formats for Scheduling of PDSCH
7.3.1.2.1 Format 1_0
DCI format 1_0 is used for the scheduling of PDSCH in one DL cell.

The following information is transmitted by means of the DCI format 1_0 with CRC scrambled by C-RNTI or CS-RNTI or new-RNTI:
Identifier for DCI formats—1 bits
  The value of this bit field is always set to 1, indicating a DL DCI format
Frequency domain resource assignment—$\lceil \log_2(N_{RB}^{DL,BWP}(N_{RB}^{DL,BWP}+1)/2) \rceil$ bits
  $N_{RB}^{DL,BWP}$ is the size of the active DL bandwidth part in case DCI format 1_0 is monitored in the UE specific search space and satisfying
    the total number of different DCI sizes monitored per slot is no more than 4 for the cell, and
    the total number of different DCI sizes with C-RNTI monitored per slot is no more than 3 for the cell
  otherwise, $N_{RB}^{DL,BWP}$ is the size of the initial DL bandwidth part.
[ . . . ]
Time domain resource assignment—4 bits as defined in Subclause 5.1.2.1 of [6, TS 38.214]
VRB-to-PRB mapping—1 bit according to Table 7.3.1.1.2-33
Modulation and coding scheme—5 bits as defined in Subclause 5.1.3 of [6, TS 38.214]
New data indicator—1 bit
Redundancy version—2 bits as defined in Table 7.3.1.1.1-2
HARQ process number—4 bits
Downlink assignment index—2 bits as defined in Subclause 9.1.3 of [5, TS 38.213], as counter DAI
TPC command for scheduled PUCCH—2 bits as defined in Subclause 7.2.1 of [5, TS 38.213]
PUCCH resource indicator—3 bits as defined in Subclause 9.2.3 of [5, TS 38.213]
PDSCH-to-HARQ_feedback timing indicator—3 bits as defined in Subclause 9.2.3 of [5, TS38.213]
[ . . . ]
7.3.1.2.2 Format 1_1
DCI format 1_1 is used for the scheduling of PDSCH in one cell.

The following information is transmitted by means of the DCI format 1_1 with CRC scrambled by C-RNTI or CS-RNTI or new-RNTI:
Identifier for DCI formats—1 bits
  The value of this bit field is always set to 1, indicating a DL DCI format
Carrier indicator—0 or 3 bits as defined in Subclause 10.1 of [5, TS 38.213].
Bandwidth part indicator—0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
  $n_{BWP}=n_{BWP,RRC}+1$ if $n_{BWP,RRC} \leq 3$, in which case the bandwidth part indicator is equivalent to the higher layer parameter BWP-Id;
  otherwise $n_{BWP}=n_{BWP,RRC}$, in which case the bandwidth part indicator is defined in Table 7.3.1.1.2-1;
If a UE does not support active BWP change via DCI, the UE ignores this bit field.
Frequency domain resource assignment—number of bits determined by the following, where $N_{RB}^{DL,BWP}$ is the size of the active DL bandwidth part:
  $N_{RBG}$ bits if only resource allocation type 0 is configured, where $N_{RBG}$ is defined in Subclause 5.1.2.2.1 of [6, TS38.214], $\lceil\log_2(N_{RB}^{DL,BWP}(N_{RB}^{DL,BWP}+1)/2)\rceil$ bits if only resource allocation type 1 is configured, or
$\max(\lceil\log_2(N_{RB}^{DL,BWP}(N_{RB}^{DL,BWP}+1)/2)\rceil, N_{RBG})+1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 5.1.2.2.1 of [6, TS 38.214].

For resource allocation type 1, the $\lceil\log_2(N_{RB}^{DL,BWP}(N_{RB}^{DL,BWP}+1)/2)\rceil$ LSBs provide the resource allocation as defined in Subclause 5.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment—0, 1, 2, 3, or 4 bits as defined in Subclause 5.1.2.1 of [6, TS 38.214]. The bitwidth for this field is determined as $\lceil\log_2(I)\rceil$ bits, where I is the number of entries in the higher layer parameter pdsch-AllocationList.

3GPP TS 38.321 provides the following descriptions related to DLSCH (Downlink Shared Channel) and BWP (Bandwidth Part):

5.15 Bandwidth Part (BWP) Operation

In addition to clause 12 of TS 38.213 [6], this subclause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

For each activated Serving Cell configured with a BWP, the MAC entity shall:
1> if a BWP is activated:
  2> transmit on UL-SCH on the BWP;
  2> transmit on RACH on the BWP;
  2> monitor the PDCCH on the BWP;
  2> transmit PUCCH on the BWP;
  2> transmit SRS on the BWP;
  2> receive DL-SCH on the BWP;
  2> (re-)initialize any suspended configured uplink grants of configured grant Type 1 on the active BWP according to the stored configuration, if any, and to start in the symbol according to rules in subclause 5.8.2.
1> if a BWP is deactivated:
  2> not transmit on UL-SCH on the BWP;
  2> not transmit on RACH on the BWP;
  2> not monitor the PDCCH on the BWP;
  2> not transmit PUCCH on the BWP;
  2> not report CSI for the BWP;
  2> not transmit SRS on the BWP;
  2> not receive DL-SCH on the BWP;
  2> clear any configured downlink assignment and configured uplink grant of configured grant Type 2 on the BWP;
  2> suspend any configured uplink grant of configured grant Type 1 on the inactive BWP.

Upon initiation of the Random Access procedure on a Serving Cell, the MAC entity shall for this Serving Cell:
1> if PRACH occasions are not configured for the active UL BWP:
  2> switch the active UL BWP to BWP indicated by initialUplinkBWP;
  2> if the Serving Cell is a SpCell:
    3> switch the active DL BWP to BWP indicated by initialDownlinkBWP.
1> else:
  2> if the Serving Cell is a SpCell:
    3> if the active DL BWP does not have the same bwp-Id as the active UL BWP:
      4> switch the active DL BWP to the DL BWP with the same bwp-Id as the active UL BWP.
1> perform the Random Access procedure on the active DL BWP of SpCell and active UL BWP of this Serving Cell.

If the MAC entity receives a PDCCH for BWP switching of a serving cell, the MAC entity shall:
1> if there is no ongoing Random Access procedure associated with this Serving Cell; or
1> if the ongoing Random Access procedure associated with this Serving Cell is successfully completed upon reception of this PDCCH addressed to C-RNTI (as specified in subclauses 5.1.4 and 5.1.5):
  2> perform BWP switching to a BWP indicated by the PDCCH.

If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in subclauses 5.1.4 and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure on the new activated BWP; if the MAC decides to ignore the PDCCH for BWP switching, the MAC entity shall continue with the ongoing Random Access procedure on the active BWP.

If the bwp-InactivityTimer is configured, the MAC entity shall for each activated Serving Cell:
1> if the defaultDownlinkBWP is configured, and the active DL BWP is not the BWP indicated by the defaultDownlinkBWP; or 1> if the defaultDownlinkBWP is not configured, and the active DL BWP is not the initialDownlinkBWP:
  2> if a PDCCH addressed to C-RNTI or CS-RNTI indicating downlink assignment or uplink grant is received on the active BWP; or
  2> if a PDCCH addressed to C-RNTI or CS-RNTI indicating downlink assignment or uplink grant is received for the active BWP; or
  2> if a MAC PDU is transmitted in a configured uplink grant or received in a configured downlink assignment:
    3> if there is no ongoing random access procedure associated with this Serving Cell; or
    3> if the ongoing Random Access procedure associated with this Serving Cell is successfully completed upon reception of this PDCCH addressed to C-RNTI (as specified in subclauses 5.1.4 and 5.1.5):
      4> start or restart the bwp-InactivityTimer associated with the active DL BWP.
  2> if a PDCCH for BWP switching is received on the active DL BWP, and the MAC entity switches the active BWP:
    3> start or restart the bwp-InactivityTimer associated with the active DL BWP.
  2> if Random Access procedure is initiated on this Serving Cell:
    3> stop the bwp-InactivityTimer associated with the active DL BWP of this Serving Cell, if running.
    3> if the Serving Cell is SCell:
      4> stop the bwp-InactivityTimer associated with the active DL BWP of SpCell, if running.
  2> if the bwp-InactivityTimer associated with the active DL BWP expires:
    3> if the defaultDownlinkBWP is configured:
      4> perform BWP switching to a BWP indicated by the defaultDownlinkBWP.
    3> else:
      4> perform BWP switching to the initialDownlinkBWP.

3GPP TS 38.213 provides the following descriptions related to PDCCH (Physical Downlink Control Channel) and BWP:

10 UE Procedure for Receiving Control Information

[ . . . ]

A UE monitors a set of PDCCH candidates in one or more control resource sets on the active DL BWP on each activated serving cell configured with PDCCH monitoring according to corresponding search space sets where monitoring implies decoding each PDCCH candidate according to the monitored DCI formats.

[ . . . ]

10.1 UE Procedure for Determining Physical Downlink Control Channel Assignment

A set of PDCCH candidates for a UE to monitor is defined in terms of PDCCH search space sets. A search space set can be a common search space set or a UE-specific search space set. A UE monitors PDCCH candidates in one or more of the following search spaces sets a Type0-PDCCH common search space set configured by searchSpaceZero in MasterInformationBlock or by searchSpaceSIB1 in PDCCH-ConfigCommon for a DCI format with CRC scrambled by a SI-RNTI on a primary cell;

a Type0A-PDCCH common search space set configured by searchSpace-OSI in PDCCH-ConfigCommon for a DCI format with CRC scrambled by a SI-RNTI on a primary cell;

a Type1-PDCCH common search space set configured by ra-SearchSpace in PDCCH-ConfigCommon for a DCI format with CRC scrambled by a RA-RNTI, or a TC-RNTI on a primary cell;

a Type2-PDCCH common search space set configured by pagingSearchSpace in PDCCH-ConfigCommon for a DCI format with CRC scrambled by a P-RNTI on a primary cell;

a Type3-PDCCH common search space set configured by SearchSpace in PDCCH-Config with searchSpaceType=common for DCI formats with CRC scrambled by INT-RNTI, or SFI-RNTI, or TPC-PUSCH-RNTI, or TPC-PUCCH-RNTI, or TPC-SRS-RNTI and, only for the primary cell, C-RNTI, or CS-RNTI(s); and a UE-specific search space set configured by SearchSpace in PDCCH-Config with searchSpaceType=ue-Specific for DCI formats with CRC scrambled by C-RNTI, or CS-RNTI(s).

If a UE is not provided higher layer parameter searchSpace-SIB1 for Type0-PDCCH common search space set, the UE determines a control resource set and PDCCH monitoring occasions for Type0-PDCCH common search space set as described in Subclause 13. The Type0-PDCCH common search space set is defined by the CCE aggregation levels and the number of PDCCH candidates per CCE aggregation level given in Table 10.1-1. The control resource set configured for Type0-PDCCH common search space set has control resource set index 0. The Type0-PDCCH common search space set has search space index 0.

If a UE is not provided by dedicated higher layer signaling a control resource set for Type0A-PDCCH common search space or for Type2-PDCCH common search space, the corresponding control resource set is same as the control resource set for Type0-PDCCH common search space. The CCE aggregation levels and the number of PDCCH candidates per CCE aggregation level for Type0A-PDCCH common search space or for Type2-PDCCH common search space are given in Table 10.1-1.

For Type1-PDCCH common search space, a UE can be provided a configuration for a control resource set by higher layer parameter ra-ControlResourceSet and a configuration for a search space by higher layer parameter ra-SearchSpace. If higher layer parameter ra-ControlResourceSet is not provided to the UE, the control resource set for Type1-PDCCH common search space is the same as for Type0-PDCCH common search space.

If a UE is not provided higher layer parameter searchSpaceOtherSystemInformation for Type0A-PDCCH common search space set, the association between PDCCH monitoring occasions for Type0A-PDCCH common search space set and the SS/PBCH block index are same as the association of PDCCH monitoring occasions for Type0-PDCCH common search space set as described in Subclause 13. The CCE aggregation levels and the number of PDCCH candidates per CCE aggregation level are given in Table 10.1-1.

If a UE is not provided higher layer parameter pagingSearchSpace for Type2-PDCCH common search space set, the association between PDCCH monitoring occasions for Type2-PDCCH common search space set and the SS/PBCH block index are same as the association of PDCCH monitoring occasions for Type0-PDCCH common search space set as described in Subclause 13. The CCE aggregation levels and the number of PDCCH candidates per CCE aggregation level are given in Table 10.1-1.

The UE may assume that the DM-RS antenna port associated with PDCCH receptions in the control resource set configured by pdcch-ConfigSIB1 in MasterInformation-Block and for corresponding PDSCH receptions, and the corresponding SS/PBCH block are quasi co-located with respect to average gain, QCL-TypeA, and QCL-TypeD properties, when applicable [6, TS 38.214]. The value for the DM-RS scrambling sequence initialization is the cell ID. A subcarrier spacing is provided by higher layer parameter subCarrierSpacingCommon in MasterInformationBlock.

For single cell operation or for operation with carrier aggregation in a same frequency band, a UE is not expected to monitor a PDCCH for Type0/0A/2/3-PDCCH common search space if the SS/PBCH block or the CSI-RS the UE selects for PRACH association, as described in Subclause 8.1, does not have same QCL-TypeD [6, TS 38.214] with a DM-RS for monitoring the PDCCH for Type0/0A/2/3-PDCCH common search space.

If a UE is configured with one or more downlink bandwidth parts (BWPs), as described in Subclause 12, the UE can be configured with PDCCH-ConfigCommon and PDCCH-Config for each configured DL BWP on the primary cell, other than the initial active DL BWP, as described in Subclause 12.

If a UE is provided one or more search space sets by corresponding one or more higher layer parameters search-SpaceZero, searchSpaceSIB1, searchSpaceOtherSystemInformation, pagingSearchSpace, ra-SearchSpace, and the UE is provided with a C-RNTI or a CS-RNTI, the UE monitors PDCCH candidates for DCI format 0_0 and DCI format 1_0 with the C-RNTI or the CS-RNTI in the one or more search space sets.

[ . . . ]

For each DL BWP configured to a UE in a serving cell, a UE can be provided by higher layer signalling with P≤3 control resource sets. For each control resource set, the UE is provided the following by higher layer parameter ControlResourceSet:

- a control resource set index p, 0≤p<12, by higher layer parameter controlResourceSetId;
- a DM-RS scrambling sequence initialization value by higher layer parameter pdcch-DMRS-ScramblingID;
- a precoder granularity for a number of REGs in the frequency domain where the UE can assume use of a same DM-RS precoder by higher layer parameter precoderGranularity;
- a number of consecutive symbols provided by higher layer parameter duration;
- a set of resource blocks provided by higher layer parameter frequencyDomainResources;
- CCE-to-REG mapping parameters provided by higher layer parameter cce-REG-MappingType;
- an antenna port quasi co-location, from a set of antenna port quasi co-locations provided by higher layer parameter TCI-StatesPDCCH, indicating quasi co-location information of the DM-RS antenna port for PDCCH reception;
- an indication for a presence or absence of a transmission configuration indication (TCI) field for DCI format 1_1 transmitted by a PDCCH in control resource set p, by higher layer parameter TCI-PresentInDCI.

When precoderGranularity=allContiguousRBs, a UE does not expect to be configured a set of resource blocks of a control resource set that includes more than four sub-sets of resource blocks that are not contiguous in frequency.

For each control resource set in a DL BWP of a serving cell, a respective higher layer parameter frequencyDomainResources provides a bitmap. The bits of the bitmap have a one-to-one mapping with non-overlapping groups of 6 PRBs, in ascending order of the PRB index in the DL BWP bandwidth of $N_{RB}^{BWP}$ PRBs with starting position $N_{BWP}^{start}$ where the first PRB of the first group of 6 PRBs has index $6 \cdot \lceil N_{BWP}^{start}/6 \rceil$. A group of 6 PRBs is allocated to a control resource set if a corresponding bit value in the bitmap is 1; else, if a corresponding bit value in the bitmap is 0, the group of 6 PRBs is not allocated to the control resource set.

If a UE has received initial configuration of more than one TCI states by higher layer parameter TCI-StatesPDCCH but has not received a MAC CE activation command for one of the TCI states, the UE assumes that the DM-RS antenna port associated with PDCCH reception is quasi co-located with the SS/PBCH block the UE identified during the initial access procedure.

If the UE has received a MAC CE activation command for one of the TCI states, the UE applies the activation command 3 msec after a slot where the UE transmits HARQ-ACK information for the PDSCH providing the activation command.

If a UE has received higher layer parameter TCI-StatesPDCCH containing a single TCI state, the UE assumes that the DM-RS antenna port associated with PDCCH reception is quasi co-located with the one or more DL RS configured by the TCI state.

For each DL BWP configured to a UE in a serving cell, the UE is provided by higher layers with S≤10 search space sets where, for each search space set from the S search space sets, the UE is provided the following by higher layer parameter SearchSpace:

- a search space set index s, 0≤s<40, by higher layer parameter searchSpaceId;
- an association between the search space set s and a control resource set p by higher layer parameter controlResourceSetId;
- a PDCCH monitoring periodicity of $k_{p,s}$ slots and a PDCCH monitoring offset of $o_{p,s}$ slots, by higher layer parameter monitoringSlotPeriodicityAndOffset;
- a PDCCH monitoring pattern within a slot, indicating first symbol(s) of the control resource set within a slot for PDCCH monitoring, by higher layer parameter monitoringSymbolsWithinSlot;
- a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;
- an indication that search space set s is either a common search space set or a UE-specific search space set by higher layer parameter searchSpaceType;
- if search space set s is a common search space set,
  - an indication by higher layer parameter dci-Format0-0-AndFormat1-0 to monitor PDCCH candidates for DCI format 0_0 and DCI format 1_0 with CRC scrambled by a C-RNTI or a CS-RNTI (if configured), RA-RNTI, TC-RNTI, P-RNTI, SI-RNTI;
  - an indication by higher layer parameter dci-Format2-0 to monitor one or two PDCCH candidates for DCI format 2_0 and a corresponding CCE aggregation level;
  - an indication by higher layer parameter dci-Format2-1 to monitor PDCCH candidates for DCI format 2_1;

an indication by higher layer parameter dci-Format2-2 to monitor PDCCH candidates for DCI format 2_2;
an indication by higher layer parameter dci-Format2-3 to monitor PDCCH candidates for DCI format 2_3;
if search space set s is a UE-specific search space set, an indication by higher layer parameter dci-Formats to monitor PDCCH candidate either for DCI format 0_0 and DCI format 1_0, or for DCI format 0_1 and DCI format 1_1.

The UE may also be provided, by higher layer parameter duration, a duration of $T_{p,s} < k_{p,s}$ slots indicating a number of slots that the search space set s exists.

If the higher layer parameter monitoringSymbolsWithin-Slot indicates to a UE only one PDCCH monitoring occasion within a slot, the UE does not expect to be configured with a PDCCH subcarrier spacing other than 15 kHz for the corresponding search space set s if the control resource set p associated with the search space s includes at least one symbol after the third symbol of the slot.

A UE does not expect to be provided a first symbol and a number of consecutive symbols for a control resource set that results to a PDCCH candidate mapping to symbols of different slots.

A UE does not expect any two PDCCH monitoring occasions, for a same search space set or for different search space sets, in a same control resource set to be separated by a non-zero number of symbols that is smaller than the control resource set duration.

A UE determines a PDCCH monitoring occasion from the PDCCH monitoring periodicity, the PDCCH monitoring offset, and the PDCCH monitoring pattern within a slot. For search space set s in control resource set p, the UE determines that a PDCCH monitoring occasion(s) exists in a slot with number $n_{s,f}^{\mu}$ [4, TS 38.211] in a frame with number $n_f$ if $(n_f N_{slot}^{frame,\mu} + n_{s,f}^{\mu} - o_{p,s}) \mod k_{p,s} = 0$. If the UE is provided higher layer parameter duration, the UE monitors PDCCH for search space set s in control resource set p for $T_{p,s}$ consecutive slots, starting from slot $n_{s,f}^{\mu}$, and does not monitor PDCCH for search space set s in control resource set p for the next $k_{p,s} - T_{p,s}$ consecutive slots.

A PDCCH UE-specific search space at CCE aggregation level $L \in \{1, 2, 4, 8, 16\}$ is defined by a set of PDCCH candidates for CCE aggregation level L.

If a UE is configured with higher layer parameter CrossCarrierSchedulingConfig for a serving cell the carrier indicator field value corresponds to the value indicated by CrossCarrierSchedulingConfig.

For a DL BWP of a serving cell on which a UE monitors PDCCH candidates in a UE-specific search space, if the UE is not configured with a carrier indicator field, the UE monitors the PDCCH candidates without carrier indicator field. For a serving cell on which a UE monitors PDCCH candidates in a UE-specific search space, if a UE is configured with a carrier indicator field, the UE monitors the PDCCH candidates with carrier indicator field.

A UE is not expected to monitor PDCCH candidates on a DL BWP of a secondary cell if the UE is configured to monitor PDCCH candidates with carrier indicator field corresponding to that secondary cell in another serving cell. For the DL BWP of a serving cell on which the UE monitors PDCCH candidates, the UE monitors PDCCH candidates at least for the same serving cell.

For a search space set s associated with control resource set p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i$$

where
for any common search space, $Y_{p,n_{s,f}^{\mu}} = 0$;
for a UE-specific search space, $$Y_{p,n_{s,f}^{\mu}} = \left( A_p \cdot Y_{p,n_{s,f}^{\mu} - 1} \right) \mod D,$$

$Y_{p,-1} = n_{RNTI} \neq 0$, $A_0 = 39827$ for p mod 3=0, $A_1 = 39829$ for p mod 3=1, $A_2 = 39839$ for p mod 3=2, and D=65537;
$i = 0, \ldots, L-1$;
$N_{CCE,p}$ is the number of CCEs, numbered from 0 to $N_{CCE,p} - 1$, in control resource set p;
$n_{CI}$ is the carrier indicator field value if the UE is configured with a carrier indicator field by higher layer parameter CrossCarrierSchedulingConfig for the serving cell on which PDCCH is monitored; otherwise, including for any common search space, $n_{CI} = 0$;
$m_{s,n_{CI}} = 0, \ldots, M_{p,s,n_{CI}}^{(L)} - 1$, where $M_{p,s,n_{CI}}^{(L)}$ is the number of PDCCH candidates the UE is configured to monitor for aggregation level L for a serving cell corresponding to $n_{CI}$ and a search space set s;
for any common search space, $M_{p,s,max}^{(L)} = M_{p,s,0}^{(L)}$;
for a UE-specific search space, $M_{p,s,max}^{(L)}$ is the maximum of $M_{p,s,n_{CI}}^{(L)}$ over all configured $n_{CI}$ values
for a CCE aggregation level L of search space set s in control resource set p;
the RNTI value used for $n_{RNTI}$ is defined in [5, TS 38.212] and in [6, TS 38.214].

A UE that is configured for operation with carrier aggregation, and indicates support of search space sharing through higher layer parameter searchSpaceSharingCA-UL, and has a PDCCH candidate with CCE aggregation level L in control resource set p for a DCI format 0_1 having a first size and associated with serving cell $n_{CI,2}$, can receive a corresponding PDCCH through a PDCCH candidate with CCE aggregation level L in control resource set p for a DCI format 0_1 having a second size and associated with serving cell $n_{CI,1}$ if the first size and the second size are same. A UE that is configured for operation with carrier aggregation, and indicates support of search space sharing through higher layer parameter searchSpaceSharingCA-DL, and has a PDCCH candidate with CCE aggregation level L in control resource set p for a DCI format 1_1 having a first size and associated with serving cell $n_{CI,2}$, can receive a corresponding PDCCH through a PDCCH candidate with CCE aggregation level L in control resource set p for a DCI format 1_1 having a second size and associated with serving cell $n_{CI,1}$ if the first size and the second size are same.

A PDCCH candidate with index $m_{S_j,n_{CI}}$ for a search space set $s_j$ using a set of CCEs in a control resource set p for serving cell $n_{CI}$ is not counted as a monitored PDCCH candidate if there is a PDCCH candidate with index $m_{S_i,n_{CI}}$ for a search space set $s_i < s_j$ in the control resource set p for serving cell $n_{CI}$ using a same set of CCEs, have identical scrambling, and the corresponding DCI formats for the PDCCH candidates have a same size; otherwise, the PDCCH candidate with index $m_{S_j,n_{CI}}$ is counted as a monitored PDCCH candidate.

Table 10.1-2 provides the maximum number of monitored PDCCH candidates, $M_{PDCCH}^{max,slot,\mu}$, for subcarrier spacing configuration μ for a UE per slot for operation with a single serving cell.

[ . . . ]

A UE does not expect to be configured common search space sets that result to corresponding total numbers of monitored PDCCH candidates and non-overlapped CCEs per slot that exceed the corresponding maximum numbers per slot.

For same cell scheduling, a UE does not expect a number of PDCCH candidates for DCI formats with different size and/or different corresponding DM-RS scrambling sequences, and a number of corresponding non-overlapped CCEs per slot on a secondary cell to be larger than the corresponding numbers that the UE is capable of monitoring on the secondary cell per slot.

[ . . . ]

The UE allocates monitored PDCCH candidates to UE-specific search space sets of the primary cell with subcarrier spacing configuration μ in slot n according to the following pseudocode. A UE is not expected to monitor PDCCH in a UE-specific search space set without monitored PDCCH candidates.

< . . . >

A UE configured with a bandwidth part indicator in DCI formats 0_1 or 1_1 determines, in case of an active DL BWP or of an active UL BWP change, the DCI information applicable to the new active DL BWP or UL BWP, respectively, as described in Subclause 12.

[ . . . ]

12 Bandwidth Part Operation

[ . . . ]

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink and a set of at most four BWPs for transmissions by the UE (UL BWP set) in an UL bandwidth by parameter BWP-Uplink for the serving cell.

An initial active DL BWP is defined by a location and number of contiguous PRBs, a subcarrier spacing, and a cyclic prefix, for the control resource set for Type0-PDCCH common search space. For operation on the primary cell or on a secondary cell, a UE is provided an initial active UL BWP by higher layer parameter initialuplinkBWP. If the UE is configured with a supplementary carrier, the UE can be provided an initial UL BWP on the supplementary carrier by higher layer parameter initialUplinkBWP in supplementaryUplink.

If a UE has dedicated BWP configuration, the UE can be provided by higher layer parameter firstActiveDownlink-BWP-Id a first active DL BWP for receptions and by higher layer parameter firstActiveUplinkBWP-Id a first active UL BWP for transmissions on the primary cell.

For each DL BWP or UL BWP in a set of DL BWPs or UL BWPs, respectively, the UE is configured the following parameters for the serving cell as defined in [4, TS 38.211] or [6, TS 38.214]:
- a subcarrier spacing provided by higher layer parameter subcarrierSpacing;
- a cyclic prefix provided by higher layer parameter cyclicPrefix;
- a first PRB and a number of contiguous PRBs indicated by higher layer parameter locationAndBandwidth that is interpreted as RIV according to [4, TS 38.214], setting $N_{BWP}^{size}=275$, and the first PRB is a PRB offset relative to the PRB indicated by higher layer parameters offsetToCarrier and subcarrierSpacing;
- an index in the set of DL BWPs or UL BWPs by respective higher layer parameter bwp-Id;
- a set of BWP-common and a set of BWP-dedicated parameters by higher layer parameters bwp-Common and bwp-Dedicated [12, TS 38.331]

For unpaired spectrum operation, a DL BWP from the set of configured DL BWPs with index provided by higher layer parameter bwp-Id for the DL BWP is linked with an UL BWP from the set of configured UL BWPs with index provided by higher layer parameter bwp-Id for the UL BWP when the DL BWP index and the UL BWP index are equal. For unpaired spectrum operation, a UE does not expect to receive a configuration where the center frequency for a DL BWP is different than the center frequency for an UL BWP when the bwp-Id of the DL BWP is equal to the bwp-Id of the UL BWP.

For each DL BWP in a set of DL BWPs on the primary cell, a UE can be configured control resource sets for every type of common search space and for UE-specific search space as described in Subclause 10.1. The UE does not expect to be configured without a common search space on the PCell, or on the PSCell, in the active DL BWP.

For each UL BWP in a set of UL BWPs, the UE is configured resource sets for PUCCH transmissions as described in Subclause 9.2.

A UE receives PDCCH and PDSCH in a DL BWP according to a configured subcarrier spacing and CP length for the DL BWP. A UE transmits PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set, for DL receptions. If a bandwidth part indicator field is configured in DCI format 0_1, the bandwidth part indicator field value indicates the active UL BWP, from the configured UL BWP set, for UL transmissions. If a bandwidth part indicator field is configured in DCI format 0_1 or DCI format 1_1 and indicates an UL BWP or a DL BWP different from the active UL BWP or DL BWP, respectively, the UE shall
- for each information field in the received DCI format 0_1 or DCI format 1-1
  - if the size of the information field is smaller than the one required for the DCI format 0_1 or DCI format 1_1 interpretation for the UL BWP or DL BWP that is indicated by the bandwidth part indicator, respectively, the UE prepends zeros to the information field until its size is the one required for the interpretation of the information field for the UL BWP or DL BWP prior to interpreting the DCI format 0_1 or DCI format 1_1 information fields, respectively;
  - if the size of the information field is larger than the one required for the DCI format 0_1 or DCI format 1_1 interpretation for the UL BWP or DL BWP that is indicated by the bandwidth part indicator, respectively, the UE uses a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively;
- set the active UL BWP or DL BWP to the UL BWP or DL BWP indicated by the bandwidth part indicator in the DCI format 0_1 or DCI format 1_1, respectively.

A UE expects to detect a DCI format 0_1 indicating active UL BWP change, or a DCI format 1_1 indicating active DL BWP change, only if a corresponding PDCCH is received within the first 3 symbols of a slot.

For the primary cell, a UE can be provided by higher layer parameter defaultDownlinkBWP-Id a default DL BWP among the configured DL BWPs. If a UE is not provided a default DL BWP by higher layer parameter defaultDownlinkBWP-Id, the default DL BWP is the initial active DL BWP.

If a UE is configured for a secondary cell with higher layer parameter defaultDownlinkBWP-Id indicating a default DL BWP among the configured DL BWPs and the UE is configured with higher layer parameter bwp-InactivityTimer indicating a timer value, the UE procedures on the secondary cell are same as on the primary cell using the timer value for the secondary cell and the default DL BWP for the secondary cell.

If a UE is configured by higher layer parameter bwp-InactivityTimer a timer value for the primary cell [11, TS 38.321] and the timer is running, the UE increments the timer every interval of 1 millisecond for frequency range 1 or every 0.5 milliseconds for frequency range 2 if the UE does not detect a DCI format for PDSCH reception on the primary cell for paired spectrum operation or if the UE does not detect a DCI format for PDSCH reception or a DCI format for PUSCH transmission on the primary cell for unpaired spectrum operation during the interval [11, TS 38.321].

If a UE is configured by higher layer parameter BWP-InactivityTimer a timer value for a secondary cell [11, TS 38.321] and the timer is running, the UE increments the timer every interval of 1 millisecond for frequency range 1 or every 0.5 milliseconds for frequency range 2 if the UE does not detect a DCI format for PDSCH reception on the secondary cell for paired spectrum operation or if the UE does not detect a DCI format for PDSCH reception or a DCI format for PUSCH transmission on the secondary cell for unpaired spectrum operation during the interval. The UE may deactivate the secondary cell when the timer expires.

If a UE is configured by higher layer parameter firstActiveDownlinkBWP-Id a first active DL BWP and by higher layer parameter firstActiveUplinkBWP-Id a first active UL BWP on a secondary cell or supplementary carrier, the UE uses the indicated DL BWP and the indicated UL BWP on the secondary cell as the respective first active DL BWP and first active UL BWP on the secondary cell or supplementary carrier.

For paired spectrum operation, a UE does not expect to transmit HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding HARQ-ACK information transmission on the PUCCH.

A UE does not expect to monitor PDCCH when the UE performs RRM measurements [10, TS 38.133] over a bandwidth that is not within the active DL BWP for the UE.

R1-1710838 provides the following descriptions related to a mechanism of cross-slot scheduling:

For UL responses to DL control/data, there is agreement that cross-slot timing will be the UE default mode of operation, with further study required for optional same slot timing, but currently for DL data scheduling the converse is true.

Cross-slot scheduling in the downlink with nonzero K0 presents significant opportunities for power saving in the UE. Control channel monitoring represents a large proportion of UE power consumption in many use cases [2], and can account for over half of daily battery drain [3], even when a majority of slots being monitored contain no data that is relevant for the monitoring UE.

A large component of this power consumption arises because in each slot, downlink data must be captured assuming the maximum throughput configuration for the entire duration of PDCCH decoding, in case some of the captured data is represented in a downlink allocation which may or may not be present.

In general less energy is required to capture and decode PDCCH than to decode PDSCH, because typically a smaller set of resource blocks is involved, lower order modulation is used and there can be a significant reduction in the bandwidth of interest. This can mean that fewer modem resources are needed for a PDCCH-only decode, leading to reductions in UE power consumption during the decoding process. Consequently, if a UE can know in advance that it need not decode PDSCH in the current slot, it only needs to enable sufficient DL resources to receive and decode PDCCH, and can disable the receiving resources as soon as the PDCCH symbols have been captured.

It is further the case that if the target of a data assignment DCI can be decoded at the earliest opportunity, ideally using only the information transmitted in the first symbol of the slot, early termination of further PDCCH capture and decode can lead to additional power savings.

FIG. 1 illustrates an example of the potential saving that results from this mode of operation. Two of the three TTIs shown contain no data for the UE. When K0=0 this is not known in advance, so the UE must receive at full bandwidth from the start of the TTI until DCI decoding is complete, in case there is further data to process. In the K0=1 case receive is only required to be active for the control period, and if the control channel can be received over a narrower bandwidth the UE can operate at a lower power level. In addition, the Rx resources can be switched off at the end of the last control period symbol, giving a further power reduction. The data and no-data cases both terminate when DCI processing has completed and enter microsleep. In the data periods the power saving is smaller, is the same in both cases until the final DCI decode, but there is a smaller power saving for the final DCI decode. In most use cases the slots with no data form the majority, and the power saving can be substantial.

The actual savings obtained will depend on data traffic patterns and UE implementation, but a simple numerical example will illustrate the principle. Table 1 below gives an example calculation assuming that DCI processing time is 4.5 symbols in duration.

[ . . . ]

Thus a PDCCH-only TTI requires 43.0% of the power of a slot which carries data for the UE if K0=0, but only 17.2% if K0=1. In a typical use case where 80% of TTIs are PDCCH-only, and only 20% carry data for the monitoring UE, the total power is calculated in Table 2 below as:

[ . . . ]

Thus, the example UE configured for K0=0 would consume 54.4% of the maximum throughput power in this scenario, but the same UE configured for K0=1 would consume only 34.6% of maximum throughput power. This would extend its battery life in the use case described by 57%. Proportionately greater savings might be expected in DRX use cases, because the significant savings for PDCCH-only slots would also apply to the expiry of the inactivity timer at the end of each DRX period.

When compared with same-slot DL scheduling this approach can increase data buffering requirements in the gNB, but the resulting extension of UE battery life will reduce recharging downtime for individual users, leading to net gains in network traffic, operator revenues and user satisfaction.

Observation 1: Cross-Slot Scheduling with K0≥1 Reduces UE Power Consumption Significantly Cross-Slot Scheduling and Latency A particular concern for cross-slot scheduling is the extra delay added by allowing a pre-launch of the control channel. K0 and K1 both contribute to the overall delay, and while the latency concern maybe true for low values of K1=0, 1, the impact on latency for larger value of K1, K1≥2 and a K0 of 1 slot is proportionally less significant.

Observation 2: Latency Impact of Cross-Slot Scheduling is Limited for K1≥2

Furthermore many applications and use cases will be less sensitive to increased latency. This is particularly true for smartphone usage where latency is less of a concern but battery life is a particular differentiator. We therefore propose that cross-slot scheduling should be supported by NR UEs Proposal 1: All Rel15 UEs Additionally Support K0=1 (FFS K0> 1)

In 5G/NR, monitoring occasion(s) of PDCCH within a slot or across slots could be flexibly configured as mentioned in the background. Time domain resource of PDSCH could be allocated according to time domain resource assignment field of its associated DCI (Downlink Control Information) carried on PDCCH. Each state or value in time domain resource assignment field (e.g. "0001") could be mapped to a slot offset, a starting symbol, an allocation length. Once the UE receives a PDCCH scheduling a PDSCH and indicating a value in time domain resource assignment field, the UE could determine in which slot and in which symbol(s) it would receive the PDSCH according to a slot offset, a starting symbol, an allocation length mapped to the value.

For example, a UE could monitor PDCCH in the beginning of a slot, e.g. first 1~3 symbols of a slot. If time domain resource allocation field of DCI on the PDCCH could indicate that PDSCH is allocated from the beginning of the slot (e.g. any of the first four symbols of the slot), the UE may have to receive or buffer DL symbols for a potential PDSCH before it finish the receiving and decoding corresponding DCI on PDCCH. Note that even if the earliest allocated symbol of a potential PDSCH is after the last symbol within a monitoring occasion of PDCCH, the UE may have to receive or buffer DL symbols for the potential PDSCH as long as gap in between is insufficient for the UE to finish decoding DCI. To achieve this structure, the UE has to capture signals of the completely active BWP from the first DL (or flexible symbol) or from the earliest symbol which could be allocated to a PDSCH since the UE would not know frequency domain resource allocation either before DCI is decoded so that the largest bandwidth could be allocated should be assumed. After finish the DCI reception and decoding, the UE would know if any PDSCH in this slot shall been received. If no PDSCH would been transmitted in this slot, the UE could stop the reception of DL data.

From a power consumption aspect, the UE spends more power than what is really needed on possible PDSCH reception from the first or earliest DL or flexible symbol in a slot until the UE finishes detecting and decoding DCI transmitted in this slot. The UE could save the power on receiving PDSCH if the UE is assured that PDSCH is not allocated before the UE finishes the decoding of corresponding DCI on time domain. For example, if the UE does not have to receive potential PDSCH before finishing decoding of DCI, the UE could receive DL signal during PDCCH monitoring in a (much) smaller bandwidth than active bandwidth part, e.g. a bandwidth that is similar to or same as a bandwidth of CORESET the UE monitored.

One general concept is that gNB could inform a UE whether the UE would receive a DCI indicating PDSCH with first symbol earlier than a (specific) symbol or not. The (specific) symbol could be determined according to the time required for the UE to finish the reception and/or decoding of the DCI. The (specific) symbol could be determined according to the time required for the UE to prepare or be ready for reception of a PDSCH. For example, the UE may need to adjust its reception bandwidth from a smaller bandwidth of a CORESET(s) that the UE monitors to a larger bandwidth of active bandwidth part. The specific symbol could be a symbol UE finishes the reception and decoding of the DCI and/or a symbol the UE is ready for reception of a PDSCH.

gNB informs the UE which symbol is the (specific) symbol. gNB and the UE negotiate which symbol is the first symbol. Some time domain resource allocation(s) for PDSCH configured for the UE is with a first or starting symbol earlier than the (specific) symbol. The UE is not expected to receive a DCI indicating time domain resource allocation(s) with a first or starting symbol earlier than the (specific) symbol when the information is applicable. gNB knows the resource allocation of DCI that indicates a PDSCH to a UE. If gNB knows the ability of UE to detect and decode DCI, gNB is possible to estimate to time UE finish the decoding of DCI and find the allocation of PDSCH that is indicated by corresponding DCI.

Assuming that the time duration T1 represents that the UE receives a DCI to the UE finishes the decoding of the DCI and knows the PDSCH allocation indicated by the DCI, if the UE knows that time duration between start symbol of PDSCH and the symbol the UE receives corresponding DCI would not be shorter than T1, the UE could not receive the potential PDSCH before the UE detect and decode a DCI indicating PDSCH. For example, the UE does not have to receive bandwidth of active bandwidth part before UE detects and decodes a DCI indicating PDSCH. The UE receives a (specific) bandwidth which is smaller than bandwidth of active bandwidth part before the UE detects and decodes a DCI indicating PDSCH. The (specific) bandwidth is a bandwidth of CORSET(s) UE monitors. The UE does not have to receive bandwidth of active bandwidth part before a first symbol of PDSCH indicated by DCI. The UE receives a (specific) bandwidth which is smaller than bandwidth of active bandwidth part before a first symbol of PDSCH indicated by DCI. The (specific) bandwidth is a bandwidth of CORSET(s) the UE monitors.

The information of whether the UE would receive a DCI indicating PDSCH with first symbol earlier than a (specific) symbol or not is applicable to every slot. The information of whether the UE would receive a DCI indicating PDSCH with first symbol earlier than a (specific) symbol or not is applicable to a slot n. Slot n is a slot next to another slot during which UE did not receive DCI, e.g. the UE did not receive DCI in slot n−1. Slot n is a slot after several slots during which UE didn't receive DCI, e.g. the UE didn't receive DCI in slot n−x~n−1. Slot n is a first slot of on duration. The UE could save the power on receiving PDSCH before the UE finishes the decoding corresponding DCI.

In one embodiment, gNB transmits a signal to the UE to enable/disable this method. The signal could inform whether the start symbol of a PDSCH would be earlier than the UE finishes the decoding of corresponding DCI on time domain. The signal may be noted in previous PDSCH.

In one embodiment, when the UE detects the signal is set to the value of disable this method, the UE may know that the time duration between of first symbol of next PDSCH indicated by DCI and corresponding DCI may be shorter than T1. Alternatively, when the UE detects the signal is set to the value of enable this method, the UE may know that the time duration between first symbol of next PDSCH indicated by DCI and corresponding DCI would not be shorter than T1.

In one embodiment, when the signal is not attached in one DCI indicating PDSCH, the UE may assume that a disable signal has been received. Alternatively, when the signal is not attached in one DCI indicating PDSCH, the UE may assume that an enable signal has been received.

In one embodiment, if no previous PDSCH is received, gNB is not allowed to allocate a PDSCH that the time duration between the first symbol of PDSCH and corresponding DCI is shorter than T1. The signal may only indicate the next PDSCH transmission. The signal may also indicate a number of following PDSCH transmissions. In addition, the signal may indicate PDSCH transmissions in one or several following slots. Furthermore, this signal may indicate all PDSCH transmissions until the UE detect another enable or disable signal.

If the UE is configured with a setting where allocation of time duration between start symbol of a PDSCH transmission and corresponding DCI is not shorter than T1, and the UE receives a DCI indicating PDSCH do not satisfy the time domain relationship, the UE may not receive the PDSCH and transmit NACK in corresponding HARQ.

Figure 15:
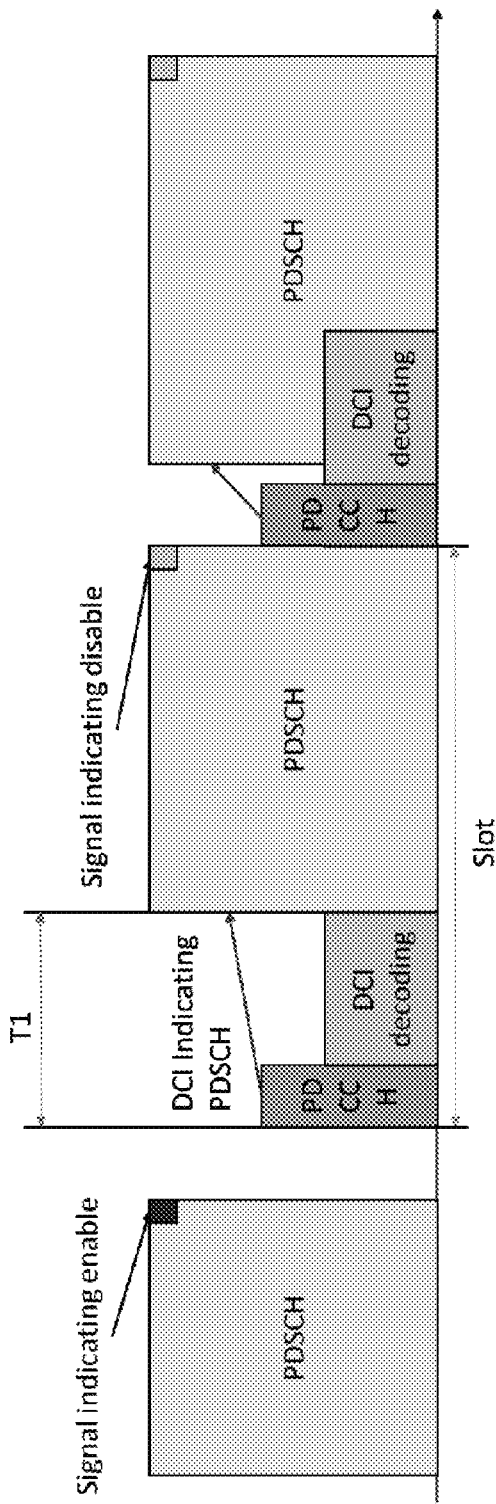
FIG. 15 is a diagram according to one exemplary embodiment.

FIG. 15 shows an example of how this signal works on time domain to help the UE saving power. A signal is attached in PDSCH to represent whether the first symbol of next PDSCH transmission would follow the time domain relationship. The UE detects the signal with value of enable in the first PDSCH in FIG. 15, and the UE knows that the next PDSCH shall be received after T1 from the UE receives corresponding DCI. Then gNB transmits a DCI indicating PDSCH in next slot. Because the PDSCH and DCI indicating the PDSCH would follow the time domain relationship, gNB allocates next PDSCH in T1 after the UE detects the DCI indicating this PDSCH. The UE does not receive PDSCH from the end of first PDSCH until the UE finishes decoding a DCI that indicating PDSCH. The UE could save the power on receiving potential PDSCH between these two PDSCH. The second PDSCH is attached with a signal set to value of disable, which means next PDSCH allocation may not follow the time domain relationship of T1. Consequently, the UE has to receive the PDSCH from the first DL or flexible symbol in next slot.

In one embodiment, if SPS PDSCH transmission is configured, gNB could indicate this signal in SPS PDSCH. Another concept is that the UE could be configured a RRC parameter to enable or disable the allocation of PDSCH to be earlier than the time the UE finishes the detection and reception of corresponding DCI on time domain. When the parameter is set to value of disable, gNB may not be allowed to allocate a PDSCH to a UE with a start symbol of PDSCH that is earlier than the time that the UE finishes the decoding of corresponding DCI. The UE could save the power on receiving PDSCH before decoding corresponding DCI. If the parameter is set to enable, gNB would not restrict the PDSCH allocation to be later than the time the UE finishes decoding corresponding DCI on time domain. the UE still has to receive PDSCH form the first DL or flexible symbol of a slot. In one embodiment, the design of time domain relation between PDSCH and corresponding DCI could be enabled or disabled per UE, per cell, or per BWP.

In one embodiment, gNB would restrict the frequency domain resource allocation that is used to transmit downlink data to a UE to a range smaller than the largest bandwidth that gNB could use. If the UE knows the frequency range may receive PDSCH is restricted, the UE does not have to receive all the signals transmitted in the largest bandwidth before the UE decodes the frequency domain resource allocation of PDSCH in corresponding DCI. The UE could only receive signals in frequency range that is indicated by gNB that may receive PDSCH before the UE decodes the DCI indicated PDSCH time and frequency domain.

Another general concept is that gNB would inform the UE whether frequency domain resource allocation that is used to transmit a PDSCH to a UE is restricted to a part of active bandwidth part of the UE depending on a first symbol of the PDSCH. The part of active bandwidth part could be a bandwidth of CORESET(s) the UE monitors. The part of active bandwidth part could also be frequency resource(s) or physical resource blocks of CORESET(s) the UE monitors.

For example, if a first symbol of the PDSCH is earlier than a (specific) symbol, frequency domain resource allocation could be restricted to part of active bandwidth part. Alternatively, if a first symbol of the PDSCH is later than a (specific) symbol, frequency domain resource allocation may not be restricted to part of active bandwidth part, e.g. frequency resource allocation could be done for the whole or entire active bandwidth part. The (specific) symbol could be determined according to the time required for the UE to finish the reception and/or decoding of the DCI. The (specific) symbol could also be determined according to the time required for the UE to prepare/ready for reception of a PDSCH.

For example, the UE may need to adjust its reception bandwidth from a smaller one bandwidth, (e.g. bandwidth of a CORESET(s) the UE monitors) to a larger one bandwidth (e.g. bandwidth of active bandwidth part). The specific symbol could be a symbol the UE finishes the reception and decoding of the DCI and/or a symbol that the UE is ready for reception of a PDSCH. gNB informs the UE which symbol is the (specific) symbol. gNB and the UE negotiate which symbol is the first symbol. Some (part of) time domain resource allocations for PDSCH configured for the UE could be with a first/starting symbol earlier than the (specific) symbol. The UE is not expected to receive a DCI indicating time domain resource allocation(s) with a first or starting symbol earlier than the (specific) symbol and indicating frequency domain resource allocation outside the part of active bandwidth part of the UE when the information is applicable.

If the UE knows the frequency range may receive early PDSCH is restricted, the UE does not have to receive all the signals transmitted in the active bandwidth part before the UE decodes corresponding DCI. The UE could only receive signals in part of active bandwidth part that may receive PDSCH before the UE decodes the DCI. If the UE receives DCI indicating PDSCH with frequency domain resource allocation outside the part of active bandwidth part, a first or starting symbol would be later than the (specific) symbol which allows the UE to prepare reception for the PDSCH, e.g. to adjust its reception bandwidth.

For example, the UE does not have to receive bandwidth of active bandwidth part before UE detects and decodes a DCI indicating PDSCH. The UE could receive a (specific) bandwidth which is smaller than bandwidth of active bandwidth part before the UE detects and decodes a DCI indicating PDSCH. The (specific) bandwidth could be a bandwidth of CORSET(s) the UE monitors. The UE does not have to receive bandwidth of active bandwidth part before a first symbol of PDSCH indicated by DCI.

Furthermore, the UE could receive a (specific) bandwidth which is smaller than bandwidth of active bandwidth part before a first symbol of PDSCH indicated by DCI. The (specific) bandwidth could be a bandwidth of CORSET(s) that the UE monitors. The information of whether the UE would receive a DCI indicating PDSCH with first symbol earlier than a (specific) symbol or not may be applicable to every slot. Alternatively, the information of whether the UE would receive a DCI indicating PDSCH with first symbol earlier than a (specific) symbol or not may be applicable to a slot n. Slot n could be a slot next to another slot during which UE did not receive DCI (e.g. the UE did not receive DCI in slot n−1). Slot n could also be a slot after several slots during which UE did not receive DCI (e.g. UE did not receive DCI in slot n−x~n−1). Slot n could be a first slot of on duration.

In one embodiment, gNB transmits a signal to the UE to enable or disable this method of restriction on frequency domain. The signal could inform whether the frequency domain allocation of a PDSCH would be restricted to a frequency range that is smaller than the maximum bandwidth gNB could use. The signal could also indicate the allocation of restricted frequency range. The signal may be noted in the previous PDSCH.

In one embodiment, when the UE detects the signal is set to the value of disable this method, the UE knows the next PDSCH would be transmitted on a restricted bandwidth that is smaller than the maximum possible bandwidth gNB may use. The range of the restricted bandwidth may be determined by gNB. The UE may get the range of restricted bandwidth gNB. In one embodiment, the range of the restricted bandwidth may be set based on the CORSET that UE has to monitor, based on the resource allocation of previous PDSCH with enable signal, or based on the frequency allocation of current active DL BWP.

In one embodiment, when the UE detects the signal is set to the value of enable this method, the UE knows that the next PDSCH indicated by DCI is allocated within the restricted bandwidth. The frequency domain restriction may only restrict PDSCH transmissions that do not satisfying time domain restriction of T1. In one embodiment, when the signal is not attached in one DCI indicated PDSCH, the UE may regard that the start symbol of next PDSCH indicated by DCI may not be allocated only within the restricted bandwidth. Alternatively, when this signal is not attached in one DCI indicated PDSCH, the UE may regard that the start symbol of next PDSCH indicated by DCI may not be allocated only within the restricted bandwidth.

In one embodiment, if no previous PDSCH is received, gNB is only allowed to allocate a DCI indicated PDSCH within the restricted bandwidth. The signal may only indicate the next PDSCH transmission. Furthermore, the signal may indicate a number of following PDSCH transmissions. The signal may also indicate PDSCH transmissions in one or several following slots. In addition, the signal may indicate all PDSCH transmissions until UE detect another enable or disable signal.

Figure 16:
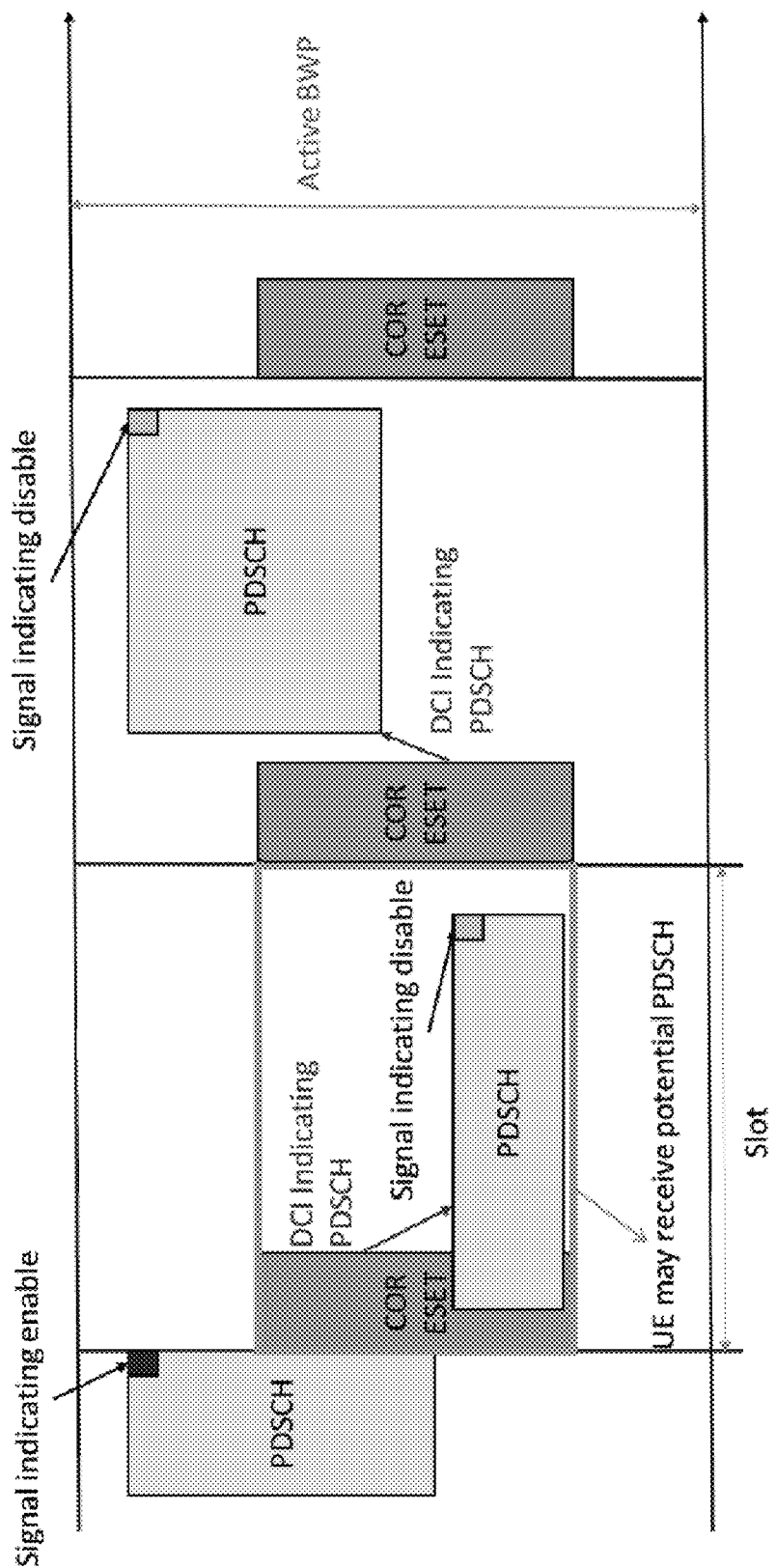
FIG. 16 is a diagram according to one exemplary embodiment.

FIG. 16 illustrates an example of how this method helping the UE saving power on monitoring potential PDSCH. The first PDSCH in FIG. 16 is attached with a signal indicating enable the method. The UE knows that the next PDSCH indicated by DCI would only be transmitted on frequency band within the range of CORESET that the UE monitors.

The UE only receives the potential PDSCH on frequency within CORESET, and does not monitor the whole or entire active BWP. The second PDSCH in FIG. 16 is attached with signal indicating disable. The UE knows that the third PDSCH may be allocated not only within the frequency range of CORESET the UE shall monitoring. The UE has to receive the potential PDSCH by monitoring the complete active BWP.

In one embodiment, if the UE is configured with a setting that allocation of a PDSCH transmission would only within the restricted bandwidth, and the UE receives a DCI indicating PDSCH do not satisfy the frequency restriction, the UE could not receive this PDSCH and transmit NACK in corresponding HARQ.

In one embodiment, the design of frequency domain restriction of PDSCH allocation could be enabled or disabled per UE. The design of frequency domain restriction of PDSCH allocation could be enabled or disabled per cell or per BWP.

A RRC (Radio Resource Control) parameter may be configured to enable or disable the signal attachment in PDSCH. In one embodiment, the RRC parameter could be configured UE-specifically, cell-specifically, or BWP-specifically. When the RRC parameter is set to the value of enable this method, gNB could attach the signal in PDSCH transmissions to indicating whether the first symbol of following PDSCH transmission(s) could be earlier than UE finishes the decoding of corresponding DCI. Alternatively, when the RRC parameter is set to the value of disable this method, gNB may not attach a signal in PDSCH transmissions.

In one embodiment, when RRC parameter is set to value of disable the method, gNB may transmit a DCI indicating PDSCH with first symbol of PDSCH that is earlier than the time UE finishes the decoding of corresponding DCI in time domain.

In one embodiment, a rule known by both the UE and gNB may be used to enable or disable of restriction of time domain and/or frequency domain resource allocation of PDSCH (e.g. restriction according to method(s) mentioned above). A RRC parameter may be set to enable or disable the restriction according to the rule. The RRC parameter could be configured UE-specifically, cell-specifically, or BWP-specifically. When the restriction is set, the UE and gNB could enable the restriction by default.

In one embodiment, the rule of enable or disable PDSCH restriction may be based on the PDSCH transmissions. When the restriction is set to enable and PDSCH is received in N1 consecutive slots in a bandwidth part and/or a cell, the UE and gNB could switch to disable the restriction (autonomously). Alternatively, when the restriction is set to disable and no PDSCH is received in N2 consecutive slots in a bandwidth part and/or a cell, the UE and gNB could switch to enable the restriction (autonomously).

In one embodiment, when the restriction is set to enable and PDSCH is received in at least N3 slots in latest N1' consecutive slots in a bandwidth part and/or a cell, the UE and gNB could switch to disable the restriction (autonomously). When the restriction is set to disable and no PDSCH is received in N4 slots in latest N2' consecutive slots in a bandwidth part and/or a cell, the UE and gNB could switch to enable the restriction (autonomously). When the restriction is set to enable and a PDSCH with size is larger than N5 resource elements is received in a bandwidth part and/or cell, the UE and gNB could switch to disable the restriction (autonomously). When the restriction is set to disable and no PDSCH with size is larger than N6 is received in a cell, the UE and gNB could switch to enable the restriction (autonomously).

In one embodiment, gNB restricts the allocation of PDSCH within a smaller range than the maximum possible range. gNB restricts the PDSCH time domain allocation. gNB restricts that the time duration between the first symbol of a PDSCH and the first symbol of corresponding DCI is not shorter than T1. The time duration T1 is from UE receives a DCI to UE finishes decoding of this DCI and knows the allocation of PDSCH indicated by this DCI. The restriction could be enabled or disabled per UE, per cell, or per BWP.

The restriction is enabled or disabled through a signal in PDSCH. When the restriction is set to enable, the UE does not receive PDSCH between the last symbol of one PDSCH and the start symbol of the next PDSCH. When this method is set to disable, it is possible for the UE to receive a DCI indicating PDSCH that the time duration between first symbol of PDSCH and first symbol of DCI indicating this PDSCH is shorter than T1. If the signal is detected as enable, the time duration between first symbol of following PDSCH and first symbol of DCI indicating the PDSCH is not shorter than T1. If the signal is detected as disable, the time duration between first symbol of following PDSCH and first symbol of DCI indicating the PDSCH may be shorter than T1. If SPS PDSCH transmission is configured, this signal of time domain restriction is attached in SPS PDSCH transmission.

The signal indicates restriction for the next PDSCH transmission. The signal indicates restriction for the PDSCH transmissions in a number of following slots. If the signal is not detected, the UE assumes that a disable signal is detected. If the signal is not detected, the UE assumes that an enable signal is detected. If no PDSCH is configured to a UE before, gNB does not allocate a PDSCH with the time duration between the first symbol PDSCH and first symbol of DCI indicating this PDSCH is shorter than T1. If the restriction is set to enable and the UE receives a DCI indicating PDSCH transmission violating the time domain relationship, the UE does not receive this PDSCH and the UE transmits NACK in corresponding HARQ feedback.

An RRC parameter is configured to UE to enable or disable the restriction. When the RRC parameter is set to the value of enable, gNB attaches a signal indicating enable or disable this method in PDSCH. When the RRC parameter is set to the value of enable, gNB does not allocate PDSCH with first symbol is earlier than UE finishes the decoding of corresponding DCI. When the RRC parameter is set to the value of disable, it is possible for gNB to allocate PDSCH with first symbol is earlier than the UE finishes the decoding of corresponding DCI. When the RRC parameter is set to the value of disable, gNB does not attach a signal indicating enable/disable this method in PDSCH. The RRC parameter could be configured per UE, per cell, or per BWP.

A rule known by both UE and gNB is used to dynamically enable or disable the time or frequency domain restriction of PDSCH allocation. A RRC parameter is set to allow the dynamically restriction or not. When The RRC parameter is set to allow the dynamically restriction, the restriction is set to enable by default. When the restriction is enabled and PDSCH is received in N1 consecutive slots in a cell, UE and gNB would switch to disable the restriction dynamically. When the restriction is disabled and no PDSCH is received in N2 consecutive slots in a cell, UE and gNB would switch to enable the restriction dynamically. When the restriction is enabled and PDSCH is received in at least N3 slots in latest N1' consecutive slots in a cell, UE and gNB would switch to disable the restriction dynamically. When the restriction is disabled and no PDSCH is received in N4 slots in latest N2' consecutive slots in a cell, UE and gNB would switch to enable the restriction dynamically. When the restriction is enabled and a PDSCH with size is larger than N5 resource elements is received in a cell, UE and gNB would switch to disable the restriction dynamically. When the restriction is disabled and no PDSCH with size is larger than N6 is received in a cell, UE and gNB would switch to enable the restriction dynamically. Value N1, N2, N3, N4, N5, N6, N1', N2' could be configured UE-specifically, cell-specifically, or BWP-specifically.

Figure 17:
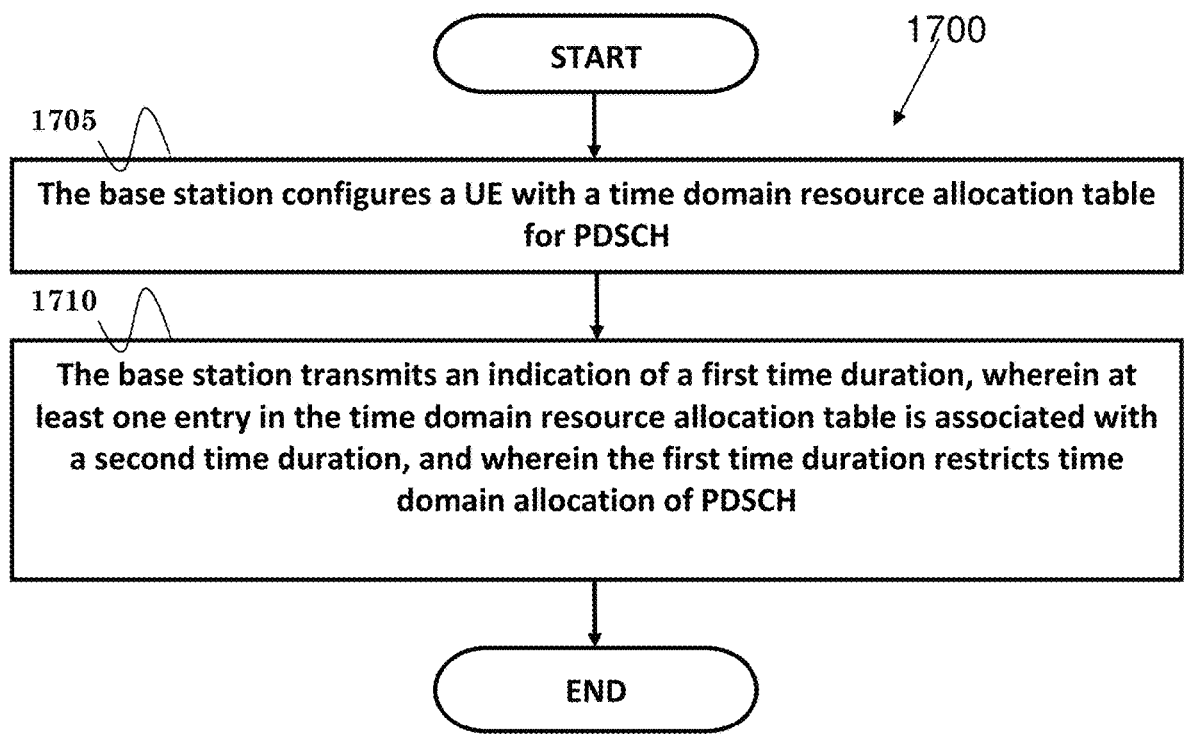
FIG. 17 is a flow chart according to one exemplary embodiment.

FIG. 17 is a flow chart 1700 according to one exemplary embodiment from the perspective of a base station. In step 1705, the base station configures a UE with a time domain resource allocation table for PDSCH. In step 1710, the base station transmits an indication of a first time duration, wherein at least one entry in the time domain resource allocation table is associated with a second time duration, and wherein the first time duration restricts time domain allocation of PDSCH.

In one embodiment, the base station could receive a preferred value of the first time duration from the UE. The first time duration informs the UE an earliest starting symbol of a time domain resource allocation indicated by DCI). The first time duration could be determined according to time required for the UE to finish DCI reception and/or DCI decoding, or according to time required for the UE to prepare PDSCH reception. The first time duration could be determined according to time required for the UE to adjust its reception bandwidth. The first time duration could be for a bandwidth part. The base station prohibits from scheduling the UE with the at least one entry. In one embodiment, the second time duration could be shorter than the first time duration.

Referring back to FIGS. 3 and 4, in one exemplary embodiment of a base station, the device 300 includes a program code 312 stored in the memory 310. The CPU 308 could execute program code 312 to enable the base station (i) to configure a UE with a time domain resource allocation table for PDSCH, (ii) to transmit an indication of a first time duration, wherein at least one entry in the time domain resource allocation table is associated with a second time duration, and wherein the first time duration restricts time domain allocation of PDSCH. Furthermore, the CPU 308 can execute the program code 312 to perform all of the above-described actions and steps or others described herein.

Figure 18:
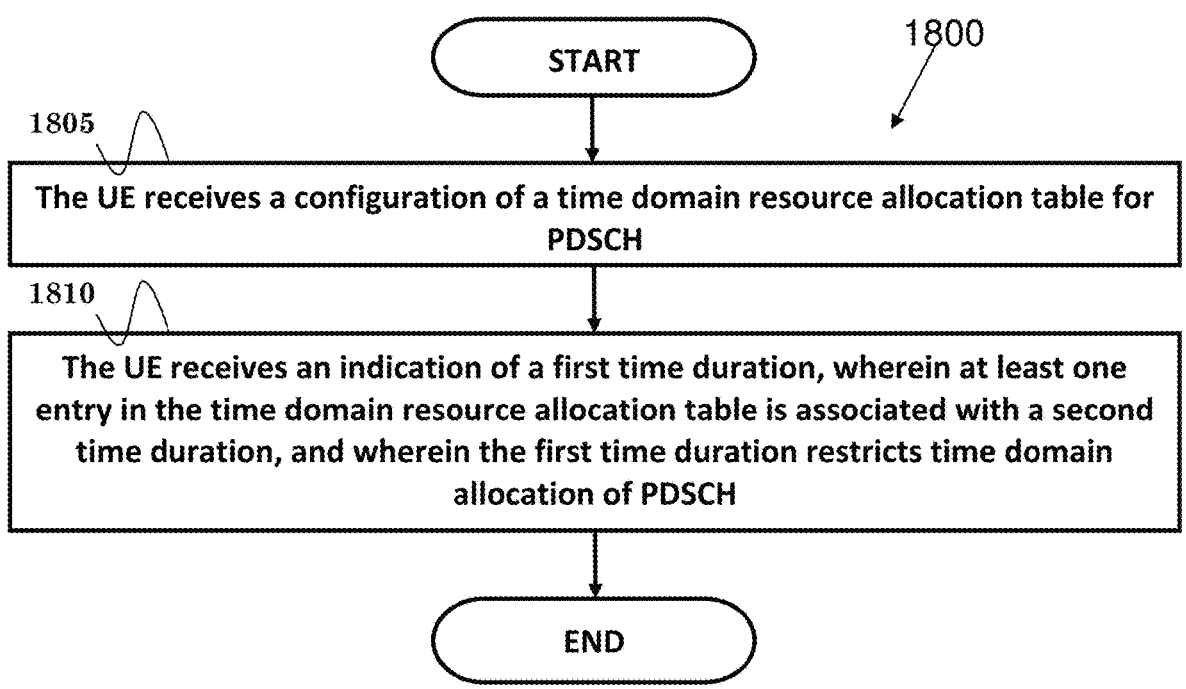
FIG. 18 is a flow chart according to one exemplary embodiment.

FIG. 18 is a flow chart 1800 according to one exemplary embodiment from the perspective of a UE. In step 1805, the UE receives a configuration of a time domain resource allocation table for PDSCH. In step 1810, the UE receives an indication of a first time duration, wherein at least one entry in the time domain resource allocation table is associated with a second time duration, and wherein the first time duration restricts time domain allocation of PDSCH.

In one embodiment, the UE could report a preferred value of the first time duration to the base station. The first time duration could restrict time domain allocation of PDSCH. The first time duration informs the UE an earliest starting symbol of a time domain resource allocation indicated by DCI. The first time duration could be determined according to time required for the UE to finish DCI reception and/or DCI decoding or according to time required for the UE to prepare PDSCH reception. The first time duration could be determined according to time required for the UE to adjust its reception bandwidth. The first time duration could be for a bandwidth part. The UE could determine whether to receive or buffer potential PDSCH based on the first time duration. A third time duration between a starting symbol of a PDSCH transmission and corresponding DCI may not be shorter than the first time duration. In one embodiment, the second time duration could be shorter than the first time duration.

In one embodiment, the UE could receive or buffer potential PDSCH if the first time duration is shorter than time required for the UE to finish DCI reception and/or DCI decoding. The UE may not receive or buffer potential PDSCH if the first time duration is not shorter than time required for the UE to finish DCI reception and/or DCI decoding.

Referring back to FIGS. 3 and 4, in one exemplary embodiment of a UE, the device 300 includes a program code 312 stored in the memory 310. The CPU 308 could execute program code 312 to enable the UE (i) to receive a configuration of a time domain resource allocation table for PDSCH, (ii) to receive an indication of a first time duration, wherein at least one entry in the time domain resource allocation table is associated with a second time duration and wherein the first time duration restricts time domain allocation of PDSCH. Furthermore, the CPU 308 can execute the program code 312 to perform all of the above-described actions and steps or others described herein.

Figure 19:
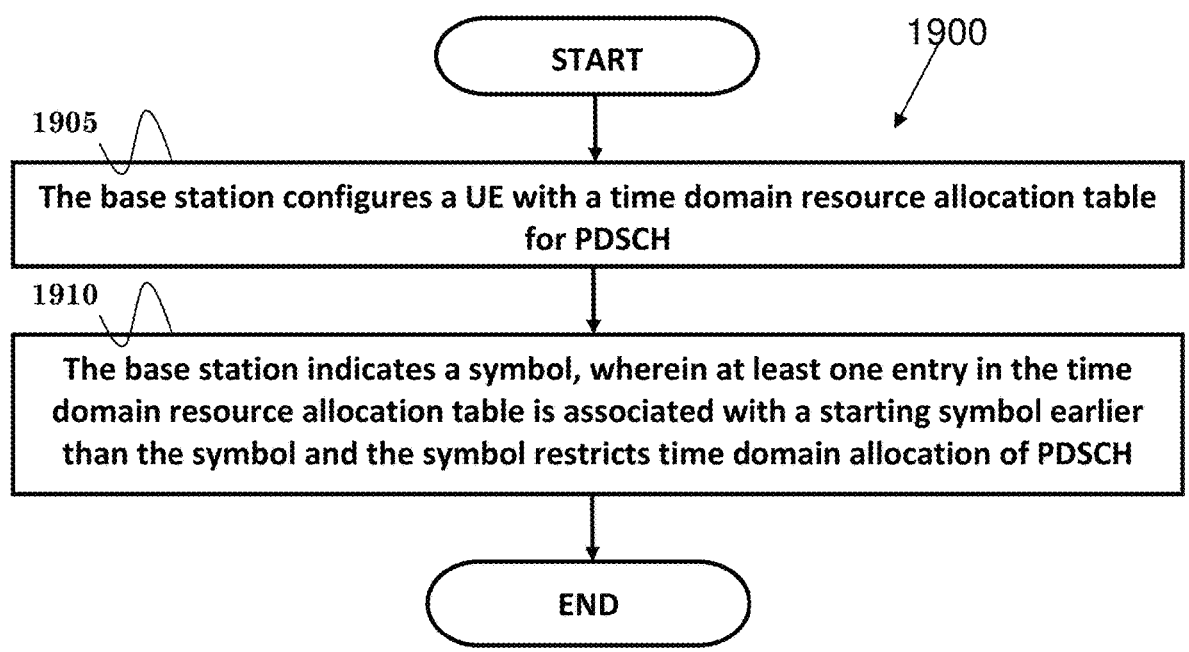
FIG. 19 is a flow chart according to one exemplary embodiment.

FIG. 19 is a flow chart 1900 according to one exemplary embodiment from the perspective of a base station. In 1905, the base station configures a UE with a time domain resource allocation table for PDSCH. In step 1910, the base station indicates a symbol, wherein at least one entry in the time domain resource allocation table is associated with a starting symbol earlier than the symbol and the symbol restricts time domain allocation of PDSCH.

In one embodiment, the base station could receive a suggestion regarding the symbol from the UE. The symbol could restrict time domain allocation of PDSCH. The symbol could be determined according to time required for the UE to finish DCI reception and/or DCI decoding or according to time required for the UE to prepare PDSCH reception. The symbol could be for a bandwidth part. The base station prohibits from scheduling the UE with the at least one entry Referring back to FIGS. 3 and 4, in one exemplary embodiment of a base station, the device 300 includes a program code 312 stored in the memory 310. The CPU 308 could execute program code 312 to enable the base station (i) to configure a UE with a time domain resource allocation table for PDSCH, (ii) to indicate a symbol, wherein at least one entry in the time domain resource allocation table is associated with a starting symbol earlier than the symbol and the symbol restricts time domain allocation of PDSCH. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a base station, comprising:
configuring a UE (User Equipment) with a time domain resource allocation table for PDSCH (Physical Downlink Shared Channel);
transmitting an indication of a first time duration to inform the UE that a third time duration between starting symbol of a PDSCH and a corresponding Downlink Control Information (DCI) is not shorter than the first time duration, wherein at least one entry in the time domain resource allocation table is associated with a second time duration and the first time duration is longer than the second time duration; and
prohibiting from scheduling the UE with the at least one entry.

2. The method of claim 1, further comprising:
receiving a preferred value of the first time duration from the UE.

3. The method of claim 1, wherein the first time duration informs the UE an earliest starting symbol of the time domain resource allocation indicated by DCI (Downlink Control Information).

4. The method of claim 1, wherein the first time duration is determined according to time required for the UE to finish DCI (Downlink Control Information) reception or DCI decoding.

5. The method of claim 1, wherein the first time duration is determined according to time required for the UE to adjust its reception bandwidth.

6. The method of claim 1, wherein the first time duration is determined according to time required for the UE to be ready for reception of PDSCH.

7. The method of claim 1, wherein the first time duration is determined according to time required for the UE to prepare PDSCH reception.

8. The method of claim 1, wherein the first time duration is for a bandwidth part.

9. The method of claim 1, wherein the base station transmits a signal to the UE to disable or enable restriction of the time domain resource allocation, and the base station schedules the UE with the at least one entry if the restriction is disabled.

10. The method of claim 9, wherein the signal is a RRC (Radio Resource Control) signal.

11. The method of claim 1, wherein restriction of the time domain resource allocation saves UE power on reception of PDSCH.

12. The method of claim 1, wherein the indication is for power saving.

13. A method for a UE (User Equipment), comprising:
receiving a configuration of a time domain resource allocation table for PDSCH (Physical Downlink Shared Channel);
receiving an indication of a first time duration indicating that a third time duration between starting symbol of a PDSCH and a corresponding Downlink Control Information (DCI) is not shorter than the first time duration, wherein at least one entry in the time domain resource allocation table is associated with a second time duration and the first time duration is longer than the second time duration; and
determining an earliest starting symbol of a time domain resource allocation indicated by DCI (Downlink Control Information) based on the first time duration, wherein the at least one entry allocates PDSCH starts before the earliest starting symbol.

14. The method of claim 13, further comprising:
reporting a preferred value of the first time duration to a base station.

15. The method of claim 13, further comprising:
determining whether to receive or buffer potential PDSCH based on the first time duration.

16. The method of claim 13, wherein the first time duration is determined according to time required for the UE to finish DCI reception or DCI decoding.

17. The method of claim 13, wherein the first time duration is determined according to time required for the UE to prepare PDSCH reception.

18. The method of claim 13, wherein the first time duration is determined according to time required for the UE to adjust its reception bandwidth.

19. The method of claim 13, wherein the first time duration is for a bandwidth part.

20. The method of claim 13, wherein the UE receives or buffers potential PDSCH if the first time duration is shorter than time required for the UE to finish DCI reception and/or DCI decoding.

21. The method of claim 13, wherein the UE does not receive or buffer potential PDSCH if the first time duration is not shorter than time required for the UE to finish DCI reception and/or DCI decoding.

22. The method of claim 13, wherein the UE receives a signal from a base station to disable or enable restriction of the time domain resource allocation, and the UE receives a scheduling with the at least one entry if restriction is disabled.

23. The method of claim 22, wherein the signal is a RRC (Radio Resource Control) signal.

24. The method of claim 13, wherein restriction of the time domain resource allocation saves UE power on reception of PDSCH.

25. The method of claim 13, wherein the indication is for power saving.

* * * * *